US008601507B2

(12) United States Patent
Billmaier et al.

(10) Patent No.: US 8,601,507 B2
(45) **Date of Patent: *Dec. 3, 2013**

(54) SYSTEM AND METHOD FOR FOCUSED NAVIGATION IN A MEDIA CENTER/EXTENSION DEVICE ARCHITECTURE

(75) Inventors: James A. Billmaier, Woodinville, WA (US); John M. Kellum, Seattle, WA (US); Charles R. Broadus, Bothell, WA (US); Dewey Reid, San Rafael, CA (US); Philip Rogan, Bozeman, MT (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1186 days.

This patent is subject to a terminal disclaimer.

(21) Appl. No.: 12/127,677

(22) Filed: May 27, 2008

(65) Prior Publication Data

US 2008/0276273 A1 Nov. 6, 2008

Related U.S. Application Data

(63) Continuation of application No. 10/260,700, filed on Sep. 30, 2002, now Pat. No. 7,380,260, which is a continuation-in-part of application No. 10/097,174, filed on Mar. 12, 2002, now abandoned.

(51) Int. Cl.
*H04N 5/445* (2011.01)

(52) U.S. Cl.
USPC .................. 725/37; 725/39; 725/40; 725/48; 725/52; 725/56

(58) Field of Classification Search
USPC ................. 725/37, 39, 40, 44, 47, 48, 52, 56
See application file for complete search history.

(56) References Cited

U.S. PATENT DOCUMENTS

| | | | |
|---|---|---|---|
| 5,138,649 | A | 8/1992 | Krisbergh et al. |
| 5,353,121 | A | 10/1994 | Young et al. |
| 5,398,074 | A | 3/1995 | Duffield et al. |
| 5,524,195 | A | 6/1996 | Clanton, III et al. |
| 5,583,560 | A | 12/1996 | Florin et al. |
| 5,602,596 | A | 2/1997 | Claussen et al. |
| 5,606,374 | A | 2/1997 | Bertram |
| 5,621,456 | A | 4/1997 | Florin et al. |
| 5,623,613 | A | 4/1997 | Rowe et al. |
| 5,633,657 | A | 5/1997 | Falcon |
| 5,663,757 | A | 9/1997 | Morales |
| 5,673,401 | A | 9/1997 | Volk et al. |
| 5,675,390 | A | 10/1997 | Schindler et al. |

(Continued)

FOREIGN PATENT DOCUMENTS

EP 1 028 570 A1 8/2000

OTHER PUBLICATIONS

Office Action mailed Jul. 12, 2007, for U.S. Appl. No. 10/259,200, filed Sep. 27, 2002.

(Continued)

*Primary Examiner* — Kieu Oanh T Bui
(74) *Attorney, Agent, or Firm* — Troy A. Van Aacken

(57) ABSTRACT

A home entertainment system includes a home media center for providing media content to a plurality of remotely located televisions within a home. The home media center includes a user interface module to generate graphical commands usable by a separate media center extension to render a focused navigation user interface on one of the plurality of televisions.

20 Claims, 19 Drawing Sheets

1300 1202d 1200d 1202e 1200e 1202c 1200c 1202a 1200a 1202f 1200f 104 1302 610 1402

(56) References Cited

U.S. PATENT DOCUMENTS

| | | | |
|---|---|---|---|
| 5,677,708 | A | 10/1997 | Matthews, III et al. |
| 5,682,511 | A | 10/1997 | Sposato et al. |
| 5,781,872 | A | 7/1998 | Konishi et al. |
| 5,812,124 | A | 9/1998 | Eick et al. |
| 5,838,326 | A | 11/1998 | Card et al. |
| 5,850,218 | A | 12/1998 | LaJoie et al. |
| 5,884,039 | A | 3/1999 | Ludwig et al. |
| 5,886,732 | A | 3/1999 | Humpleman |
| 5,949,328 | A | 9/1999 | Latty |
| 5,990,927 | A | 11/1999 | Hendricks et al. |
| 6,002,394 | A | 12/1999 | Schein et al. |
| 6,005,601 | A | 12/1999 | Ohkura et al. |
| 6,020,930 | A | 2/2000 | Legrand |
| 6,028,600 | A | 2/2000 | Rosin et al. |
| 6,037,933 | A | 3/2000 | Blonstein et al. |
| 6,046,722 | A | 4/2000 | McKiel, Jr. |
| 6,097,441 | A | 8/2000 | Allport |
| 6,118,492 | A | 9/2000 | Milnes et al. |
| 6,151,059 | A | 11/2000 | Schein et al. |
| 6,163,345 | A | 12/2000 | Noguchi et al. |
| 6,167,443 | A | 12/2000 | Decker et al. |
| 6,175,362 | B1 | 1/2001 | Harms et al. |
| 6,177,931 | B1 | 1/2001 | Alexander et al. |
| 6,188,406 | B1 | 2/2001 | Fong et al. |
| 6,198,479 | B1 | 3/2001 | Humpleman et al. |
| 6,201,540 | B1 | 3/2001 | Gallup et al. |
| 6,202,211 | B1 | 3/2001 | Williams, Jr. |
| 6,262,722 | B1 | 7/2001 | Allison et al. |
| 6,266,059 | B1 | 7/2001 | Matthews, III et al. |
| 6,266,098 | B1 | 7/2001 | Cove et al. |
| 6,281,940 | B1 | 8/2001 | Sciammarella |
| 6,289,169 | B1 | 9/2001 | Okuyama |
| 6,295,062 | B1 | 9/2001 | Tada et al. |
| 6,313,851 | B1 | 11/2001 | Matthews, III et al. |
| 6,344,880 | B1 | 2/2002 | Takahashi et al. |
| 6,378,000 | B1 | 4/2002 | Akatsu et al. |
| 6,425,129 | B1 | 7/2002 | Sciammarella et al. |
| 6,445,306 | B1 | 9/2002 | Trovato et al. |
| 6,481,011 | B1 | 11/2002 | Lemmons |
| 6,481,013 | B1 | 11/2002 | Dinwiddie et al. |
| 6,510,152 | B1 | 1/2003 | Gerszberg et al. |
| 6,522,342 | B1 | 2/2003 | Gagnon et al. |
| 6,535,888 | B1 | 3/2003 | Vijayan et al. |
| 6,538,672 | B1 | 3/2003 | Dobbelaar |
| 6,564,378 | B1 | 5/2003 | Satterfield et al. |
| 6,577,350 | B1 | 6/2003 | Proehl et al. |
| 6,590,604 | B1 | 7/2003 | Tucker et al. |
| 6,613,100 | B2 | 9/2003 | Miller |
| 6,622,307 | B1 | 9/2003 | Ho |
| 6,640,239 | B1 | 10/2003 | Gidwani |
| 6,642,939 | B1 | 11/2003 | Vallone et al. |
| 6,678,891 | B1 | 1/2004 | Wilcox et al. |
| 6,690,391 | B1 | 2/2004 | Proehl et al. |
| 6,698,021 | B1 | 2/2004 | Amini et al. |
| 6,725,215 | B2 | 4/2004 | Yamamoto |
| 6,728,675 | B1 | 4/2004 | Maddalozzo, Jr. et al. |
| 6,756,997 | B1 | 6/2004 | Ward, III et al. |
| 6,789,263 | B1 | 9/2004 | Shimada et al. |
| 6,889,385 | B1 | 5/2005 | Rakib et al. |
| 6,909,849 | B1 | 6/2005 | Staley |
| 6,934,917 | B2 | 8/2005 | Lin |
| 6,957,396 | B2 | 10/2005 | Iwamura |
| 6,976,228 | B2 | 12/2005 | Bernhardson |
| 7,065,710 | B2 | 6/2006 | Hayashi et al. |
| 2002/0033848 | A1 | 3/2002 | Sciammarella et al. |
| 2002/0051083 | A1 | 5/2002 | Aratani et al. |
| 2002/0054068 | A1 | 5/2002 | Ellis et al. |
| 2002/0056129 | A1 | 5/2002 | Blackketter et al. |
| 2002/0057336 | A1 | 5/2002 | Gaul et al. |
| 2002/0057893 | A1 | 5/2002 | Wood et al. |
| 2002/0059625 | A1 | 5/2002 | Kurauchi |
| 2002/0070958 | A1 | 6/2002 | Yeo et al. |
| 2002/0078440 | A1 | 6/2002 | Feinberg et al. |
| 2002/0095615 | A1 | 7/2002 | Hastings et al. |
| 2002/0095689 | A1 | 7/2002 | Novak |
| 2002/0104090 | A1 | 8/2002 | Stettner |
| 2002/0152474 | A1 | 10/2002 | Dudkiewicz |
| 2002/0174444 | A1 | 11/2002 | Gatto et al. |
| 2003/0001898 | A1 | 1/2003 | Bernhardson |
| 2003/0052900 | A1 | 3/2003 | Card et al. |
| 2003/0066082 | A1 | 4/2003 | Kliger et al. |
| 2003/0090524 | A1 | 5/2003 | Segerberg et al. |
| 2003/0093792 | A1 | 5/2003 | Labeeb et al. |
| 2003/0188320 | A1 | 10/2003 | Shing |
| 2004/0031058 | A1 | 2/2004 | Reisman |
| 2004/0049794 | A1 | 3/2004 | Shao et al. |
| 2004/0244056 | A1 | 12/2004 | Lorenz et al. |
| 2004/0261099 | A1 | 12/2004 | Durden et al. |
| 2005/0251827 | A1 | 11/2005 | Ellis et al. |
| 2006/0174266 | A1 | 8/2006 | Gatto et al. |

OTHER PUBLICATIONS

Office Action mailed Aug. 22, 2007, for U.S. Appl. No. 10/260,740, filed Sep. 30, 2002.

Office Action mailed Sep. 10, 2007, for U.S. Appl. No. 10/464,826, filed Jun. 18, 2003.

Office Action mailed Oct. 19, 2006, for U.S. Appl. No. 10/097,174, filed Mar. 12, 2002.

Office Action mailed May 4, 2007, for U.S. Appl. No. 10/097,174, filed Mar. 12, 2002.

Office Action mailed Jan. 11, 2007, for U.S. Appl. No. 10/105,088, filed Mar. 22, 2002.

Office Action mailed Jul. 6, 2007, for U.S. Appl. No. 10/105,088, filed Mar. 22, 2002.

Office Action mailed Jun. 13, 2007, for U.S. Appl. No. 10/108,178, filed Mar. 27, 2002.

Office Action mailed Jan. 3, 2007, for U.S. Appl. No. 10/113,889, filed Mar. 29, 2002.

Office Action mailed Jun. 15, 2007, for U.S. Appl. No. 10/113,889, filed Mar. 29, 2002.

Office Action mailed Nov. 29, 2006, for U.S. Appl. No. 10/107,601, filed Mar. 27, 2002.

Office Action mailed Jun. 20, 2007, for U.S. Appl. No. 10/107,601, filed Mar. 27, 2002.

Office Action mailed May 24, 2007, for U.S. Appl. No. 10/186,209, filed Jun. 27, 2002.

Office Action mailed Jul. 5, 2007, for U.S. Appl. No. 10/186,210, filed Jun. 27, 2002.

Office Action mailed Jun. 29, 2007, for U.S. Appl. No. 10/328,754, filed Dec. 23, 2002.

Office Action mailed Aug. 22, 2007, for U.S. Appl. No. 10/260,700, filed Sep. 30, 2002.

Office Action mailed Apr. 3, 2008, for U.S. Appl. No. 10/261,071, filed Sep. 30, 2002.

Office Action mailed Feb. 22, 2008, for U.S. Appl. No. 10/260,738, filed Sep. 30, 2002.

Office Action mailed Feb. 6, 2008, for U.S. Appl. No. 10/464,826, filed Jun. 18, 2003.

Office Action mailed Jan. 30, 2008, for U.S. Appl. No. 10/259,200, filed Sep. 27, 2002.

Office Action mailed May 29, 2008, for U.S. Appl. No. 10/260,740, filed Sep. 30, 2002.

Office Action mailed Jan. 11, 2008, for U.S. Appl. No. 10/260,740, filed Sep. 30, 2002.

Office Action mailed May 4, 2007, for U.S. Appl. No. 10/261,071, filed Sep. 30, 2002.

Office Action mailed Nov. 14, 2007, for U.S. Appl. No. 10/261,071, filed Sep. 30, 2002.

Office Action mailed Feb. 22, 2008, for U.S. Appl. No. 10/260,739, filed Sep. 30, 2002.

Notice of Allowance mailed Mar. 5, 2008, for U.S. Appl. No. 10/260,700, filed Sep. 30, 2002.

U.S. Appl. No. 10/097,174, filed Mar. 12, 2002, Billmaier et al.

U.S. Appl. No. 10/105,088, filed Mar. 22, 2002, Billmaier.

U.S. Appl. No. 10/105,083, filed Mar. 22, 2002, Billmaier.

U.S. Appl. No. 10/097,195, filed Mar. 12, 2002, Billmaier et al.

U.S. Appl. No. 10/108,178, filed Mar. 27, 2002, Billmaier et al.

U.S. Appl. No. 10/113,889, filed Mar. 29, 2002, Billmaier et al.

(56) References Cited

OTHER PUBLICATIONS

U.S. Appl. No. 10/107,601, filed Mar. 27, 2002, Billmaier et al.
U.S. Appl. No. 10/113,820, filed Mar. 29, 2002, Billmaier et al.
U.S. Appl. No. 10/186,209, filed Jun. 27, 2002, Istvan et al.
U.S. Appl. No. 10/186,210, filed Jun. 27, 2002, Billmaier et al.
U.S. Appl. No. 10/230,964, filed Aug. 29, 2002, Istvan et al.
U.S. Appl. No. 10/270,738, filed Sep. 30, 2002, Billmaier et al.
U.S. Appl. No. 10/260,208, filed Sep. 30, 2002, Billmaier et al.
U.S. Appl. No. 10/328,754, filed Dec. 23, 2002, Rappaport et al.
U.S. Appl. No. 10/259,199, filed Sep. 27, 2002, Young et al.
U.S. Appl. No. 10/138,810, filed May 3, 2002, Billmaier et al.
U.S. Appl. No. 10/138,805, filed May 3, 2002, Billmaier et al.
U.S. Appl. No. 10/138,803, filed May 3, 2002, Billmaier et al.
U.S. Appl. No. 10/183,804, filed May 3, 2002, Billmaier et al.
U.S. Appl. No. 60/317,612, filed Sep. 6, 2001, Reid et al.
U.S. Appl. No. 60/324,997, filed Sep. 26, 2001, Reid et al.
U.S. Appl. No. 10/186,094, filed Jun. 29, 2002, Billmaier et al.
U.S. Appl. No. 10/187,118, filed Jun. 29, 2002, Billmaier et al.
U.S. Appl. No. 10/186,095, filed Jun. 29, 2002, Billmaier et al.
U.S. Appl. No. 60/377,627, filed May 3, 2002, Billmaier et al.
U.S. Appl. No. 29/161,708, filed Jun. 3, 2002, Nguyen et al.
U.S. Appl. No. 10/251,366, filed Sep. 20, 2002, Allen et al.
U.S. Appl. No. 10/260,881, filed Sep. 30, 2002, Allen et al.
U.S. Appl. No. 10/320,900, filed Dec. 16, 2002, Kolde et al.
U.S. Appl. No. 10/328,514, filed Dec. 23, 2002, Kolde et al.

900

SYSTEM AND METHOD FOR FOCUSED NAVIGATION IN A MEDIA CENTER/EXTENSION DEVICE ARCHITECTURE

RELATED APPLICATIONS

This application is a continuation of U.S. patent application Ser. No. 10/260,700, now U.S. Pat. No. 7,380,260, which is a continuation-in-part of U.S. patent application Ser. No. 10/097,174, filed Mar. 12, 2002, both of which are incorporated herein by reference.

BACKGROUND

1. Field of the Invention

The present invention relates generally to home entertainment systems. More specifically, the present invention relates to a focused navigation interface for a PC media center and extension device in a home entertainment system.

2. Description of Background Art

As interactive television (ITV) becomes more popular, greater demands are being placed on cable and satellite set top boxes (STBs) used in home entertainment systems. Popular STBs, such as the Motorola™ DCT2000™, are not sufficiently powerful to implement many of the most requested ITV features, such as videoconferencing, personal video recording (PVR), video and photo editing, and so forth. These and other features would elevate an STB to the status of a "home media center" that provides access to all forms of media—video, audio, text, etc.—using a television set.

Newer, more advanced STBs are needed to implement home media centers, but subscribers may be unwilling to pay for them. Likewise, many cable and satellite providers are not able to advance the cost of $500 to $1,000 per subscriber for the new STBs.

DETAILED DESCRIPTION

Figure 1:
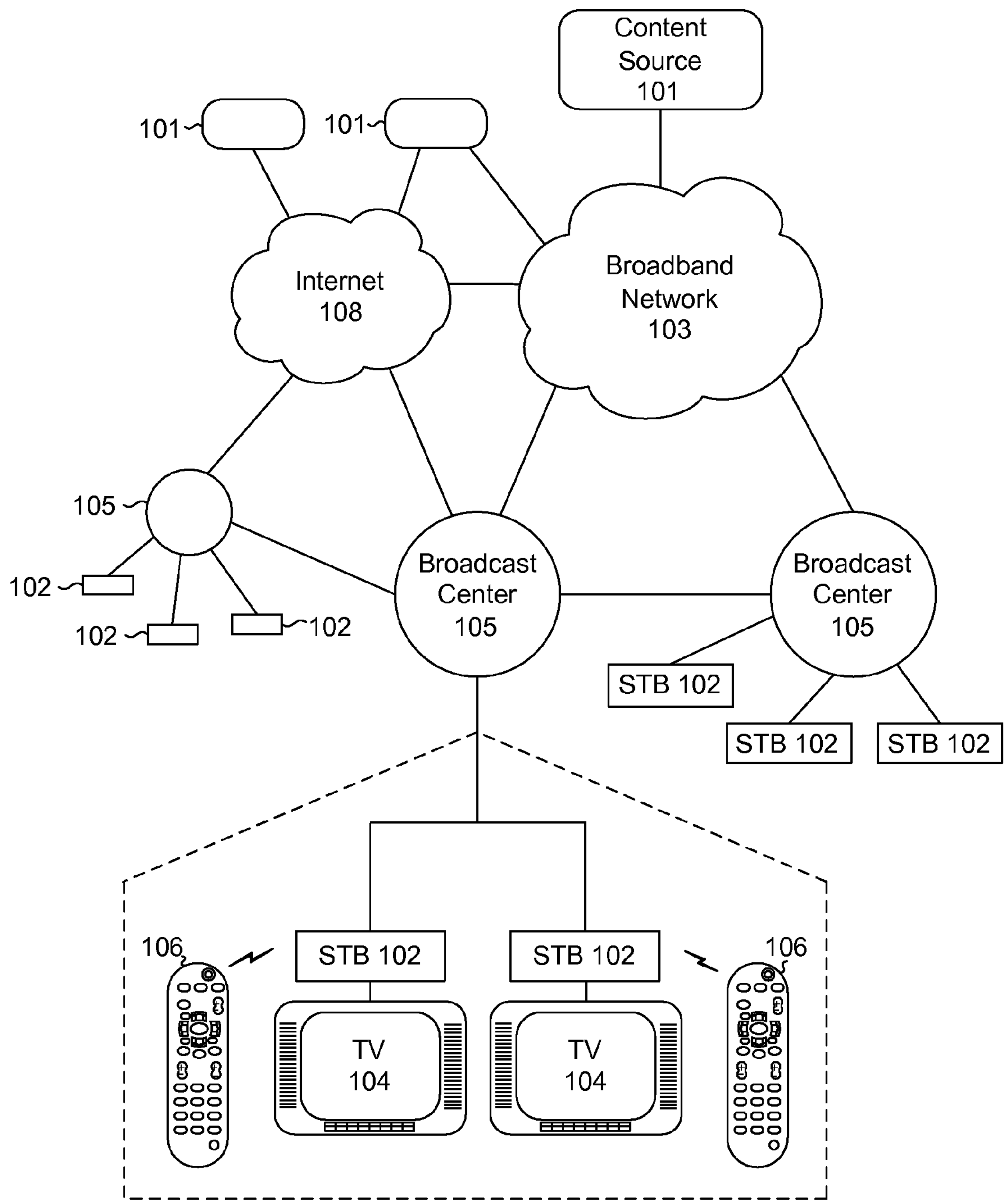
FIG. 1 is a block diagram of a system for distributing media content to subscribers.

Reference is now made to the figures in which like reference numerals refer to like or similar elements. For clarity, the first digit or digits of a reference numeral indicates the figure number in which the corresponding element is first used.

Throughout the specification, reference to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

As used herein, the term "coupled" refers not only to components that are directly connected, but also to components that are connected via one or more other components. Hence, the term "coupled" may also refer to components that are in communication with one another, although no physical or direct connection may exist.

Furthermore, the described features, structures, or characteristics may be combined in any suitable manner in one or more embodiments. In the following description, numerous specific details, such as examples of programming, software modules, user selections, network transactions, database queries, database structures, etc., are provided for a thorough understanding of the embodiments of the invention. Those skilled in the art will recognize, however, that the invention can be practiced without one or more of the specific details, or with other methods, components, materials, etc. In other instances, well-known structures, materials, or operations are not shown or not described in detail to avoid obscuring aspects of the invention.

As illustrated in FIG. 1, a typical system 100 for distributing media content to subscribers includes one or more content sources 101 linked to plurality of set top boxes (STBs) 102 by a broadband network 103. As used herein, the term "media content" should be broadly construed to include video and/or audio content, pictures, animations, text, software programs, etc. As such, content sources 101 may include television networks, websites, video servers, music servers, software archives, databases, and the like.

An STB 102 receives encoded television signals and data from the content source(s) 101 via the network 103 and displays the same on a television (TV) 104 or similar display device. As its name implies, an STB 102 is typically located in close proximity to the TV 104 (i.e. the STB 102 and the TV 104 are "collocated"). Conventionally, each TV 104 must have its own STB 102 in order to receive and display media content.

The broadband network 103 is typically a cable TV network or a direct broadcast satellite (DBS) network, although other networks are possible. The STBs 102 may be coupled to the network 103 directly or through one or more broadcast centers 105.

Within a cable TV network, a broadcast center 105 is referred to as a "head-end", which is a centrally-located facility within a community in which TV programming is received from a local cable TV satellite downlink or other source and packaged for transmission to subscriber homes. A broadcast center 105 may also be embodied as a satellite broadcast center within a DBS network.

Broadcast centers 105 may be coupled directly to one another or through the broadband network 103. In some cases, broadcast centers 105 may be connected via a separate network, one particular example of which is the Internet 108. Communication over the Internet 108 is accomplished using TCP/IP and other standard protocols.

For each STB 102, a remote control 106 is generally provided for convenient remote operation of the STB 102 and the TV 104. The remote control 106 may use infrared (IR), radio frequency (RF), or other wireless technologies to transmit control signals to the STB 102 and the TV 104.

Figure 2:
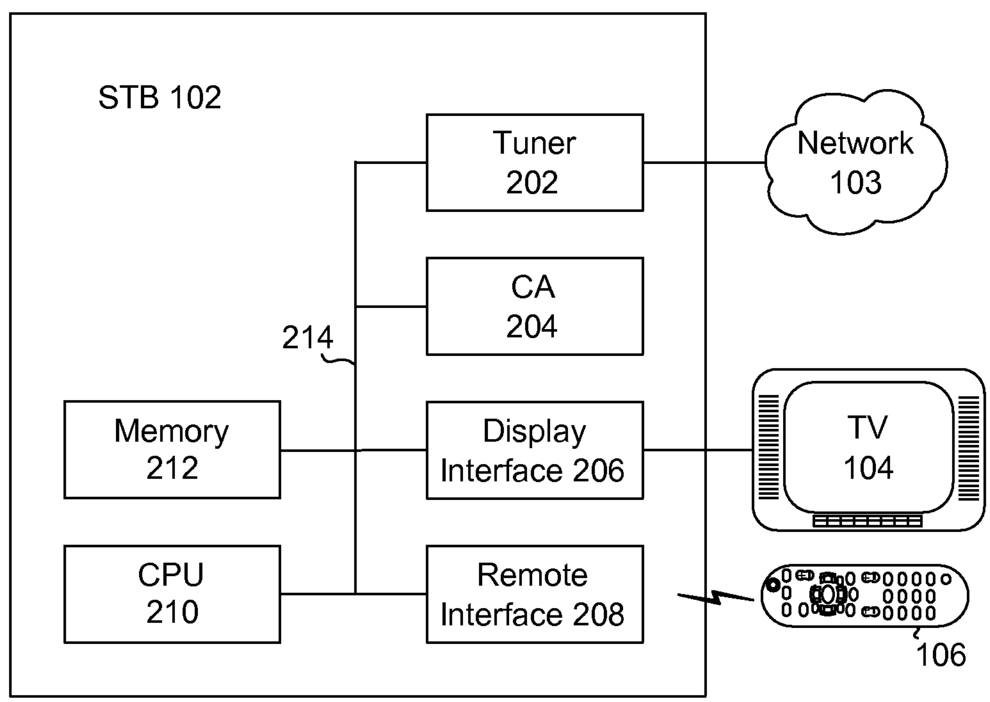
FIG. 2 is a block diagram of a standard set top box (STB)

FIG. 2 is a block diagram of a home entertainment system 200 including a standard STB 102, such as a Motorola™ DCT2000™. As depicted, the STB 102 includes a tuner 202 for selectively receiving media content from the broadband network 103 on different channels or frequencies. Various analog tuners 202 are available, such as the Broadcom™ BCM 3415™.

Increasingly, TV broadcasts are being digitally encoded and multiplexed to maximize bandwidth usage. For instance, "digital" cable utilizes MPEG (Moving Pictures Experts Group) compression to provide subscribers with many more channels than would be possible using analog techniques. Accordingly, a "digital" tuner 202 may include circuitry for selectively demodulating, demultiplexing, and decoding such content.

The STB 102 may also include a conditional access (CA) device 204 for decrypting media content for premium and pay-per-view (PPV) channels or services (e.g., HBO™, Showtime™, OnDemand™). A CA device 204 makes use of both scrambling and encryption technologies to prevent reception of a signal by unauthorized STBs 102. In one technique, encrypted messages, known as Entitlement Control Message (ECM) and Entitlement Management Message (EMM), are used. CA devices 204 and techniques are known in the art and will not be discussed in greater detail.

The STB 102 further includes a display interface 206 for rendering media content on an attached display device, such as a TV 104. A display interface 206 typically includes a graphical processor, a memory (frame buffer), and various other supporting hardware. A variety of display interfaces 206 are known, such as the ATI™ Xilleon™ 215s.

The STB 102 also includes a remote interface 208 for receiving and decoding control signals sent by remote control 106. As noted, various wireless techniques may be used, such as infrared (IR), radio frequency (RF), or the like. In one configuration, the remote interface 208 is embodied as an ATMEL™ Mega161™ IR microcontroller.

Typically, the STB 102 includes a memory 212 comprising a combination of one or more standard RAM, ROM, or EEPROM devices. The memory may be used to store user settings, EPG (Electronic Program Guide) data, an operating system (such as Windows CE™ or Linux™), middleware (such as Liberate™), and the like.

The STB 102 also typically includes a CPU 210 for controlling the operation of the STB 102, including the other components thereof, which are coupled to the CPU 210 via a bus 214. The CPU 210 may be embodied as a microprocessor (e.g., Motorola™ 68331), microcontroller, digital signal processor (DSP), or other device known in the art. The CPU 210 performs logical and arithmetic operations based on program code stored within the memory 212.

As previously explained, a growing number of subscribers are demanding advanced ITV features, such as videoconferencing, personal video recording (PVR), video and photo editing, and the like. However, such features require a more advanced STB 302 of the type depicted in the home entertainment system 300 of FIG. 3. One example of an advanced STB 302 is the Motorola™ DCT5200™ set top terminal.

As illustrated, each of the components of the STB 102 are also represented within the advanced STB 302, e.g., the tuner 202, CA device 204, display interface 206, remote interface 208, CPU 210, and memory 212. Typically, however, many of the components of the advanced STB 302 will be faster, have a greater capacity, etc., than those of the STB 102. For instance, the Motorola™ DCT5200™ may have up to 128 MB of RAM, while the DCT2000™ is limited to 7 MB.

The advanced STB 302 also includes a number of components that are not generally found in a standard STB 102. For instance, the advanced STB 302 may include a hard drive 303 for mass storage, as well as a DVD and/or CD player 304 for playing optical media. In addition, the advanced STB 302 may include a modem 305, such as a DOCSIS (Data Over Cable Service Interface Specification) cable modem, for accessing data via the network 103 and/or the Internet 108.

To enable advanced ITV features, the memory 212 of the advanced STB 302 includes a number of software modules. Of course, any of described modules may be implemented using various combinations of software, hardware, and/or firmware.

For instance, the memory 212 may include a personal video recording (PVR) module 306 to facilitate digital recording of media content. The popularity of PVR systems, such as TiVo™ and ReplayTV™, has tremendously increased in recent years. PVR systems provide a wide variety of desirable functions, such as scheduled recording of TV broadcasts for time-shifting purposes, pausing (buffering) of live TV, instant replays, and the like.

The memory 212 may also include an EPG (electronic programming guide) module 308 that provides a subscriber with a view of upcoming television programming. The EPG module 308 may display programming information in various formats, such as a timeline, grid, or the like, allowing a subscriber to easily view upcoming or current programming. In addition, the EPG module 308 may interact with the PVR module 306 to allow a subscriber to select programs for recording directly from an EPG listing. The EPG module 308 obtains programming data through the modem 305 from the Internet 108, a content source 101, or servers accessible via the network 103.

The memory 212 may further include a web browser 310, such as a version of Microsoft Internet Explorer™, to facilitate access to web content within the Internet 108. Similarly, the memory 212 may include an e-mail client 312, such as Microsoft Outlook™, a chat client 314, such as MSN Messenger™, a videophone client 316, such as Microsoft Netmeeting™, and a media player/editor 318, such as Windows Media Player™ and/or Windows Movie Maker™.

Figure 3:
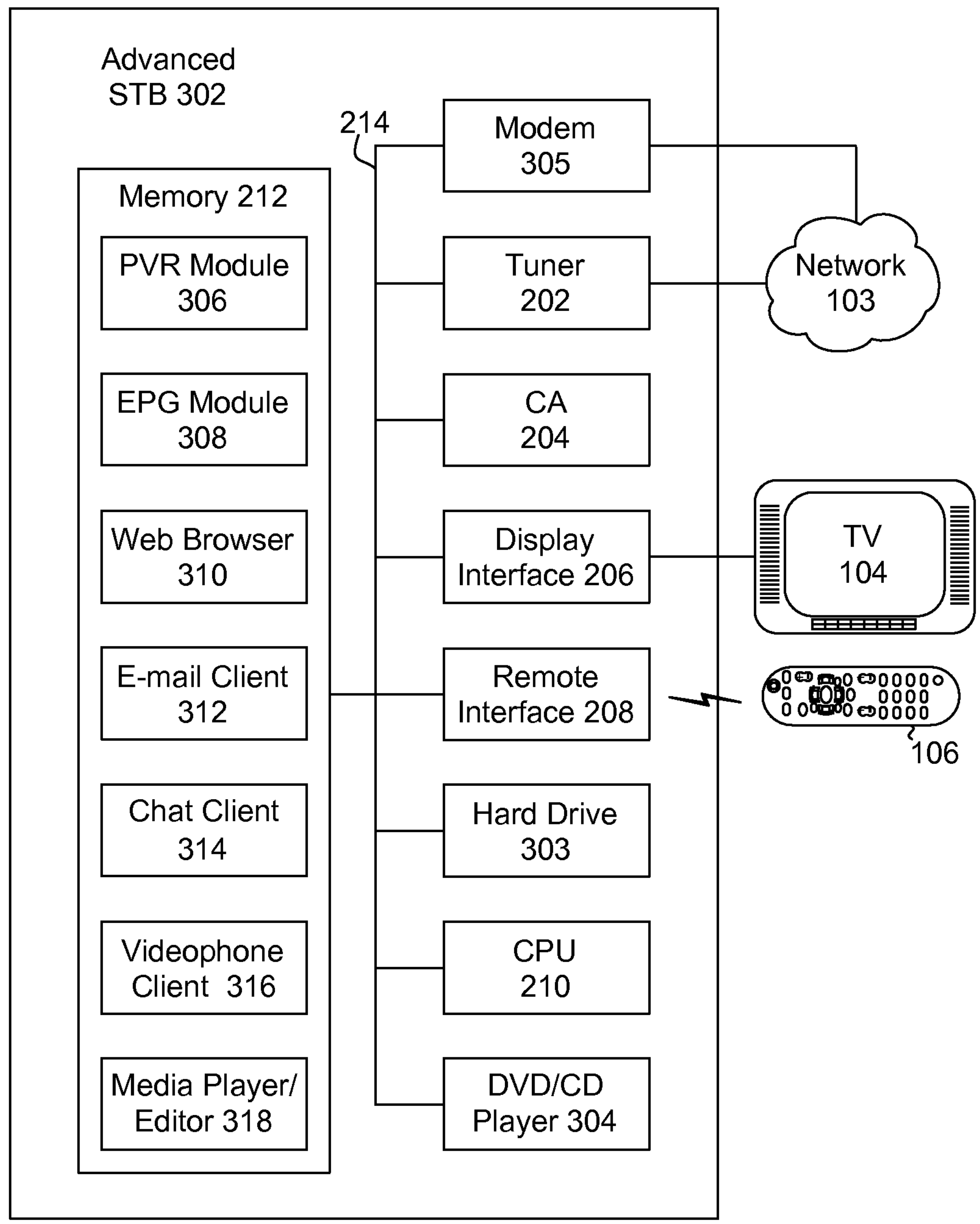
FIG. 3 is a block diagram of an advanced STB.

Unfortunately, advanced STBs 302 of the type depicted in FIG. 3 are relatively expensive. Moreover, a substantial installed base of standard STBs 102 already exists, making it difficult for cable and satellite provider to justify upgrading to the advanced STBs 302 merely to add new ITV features. Nevertheless, demand for the features exists, and a provider that can satisfy the demand at a reasonable cost will have a distinct competitive advantage.

Figure 4:
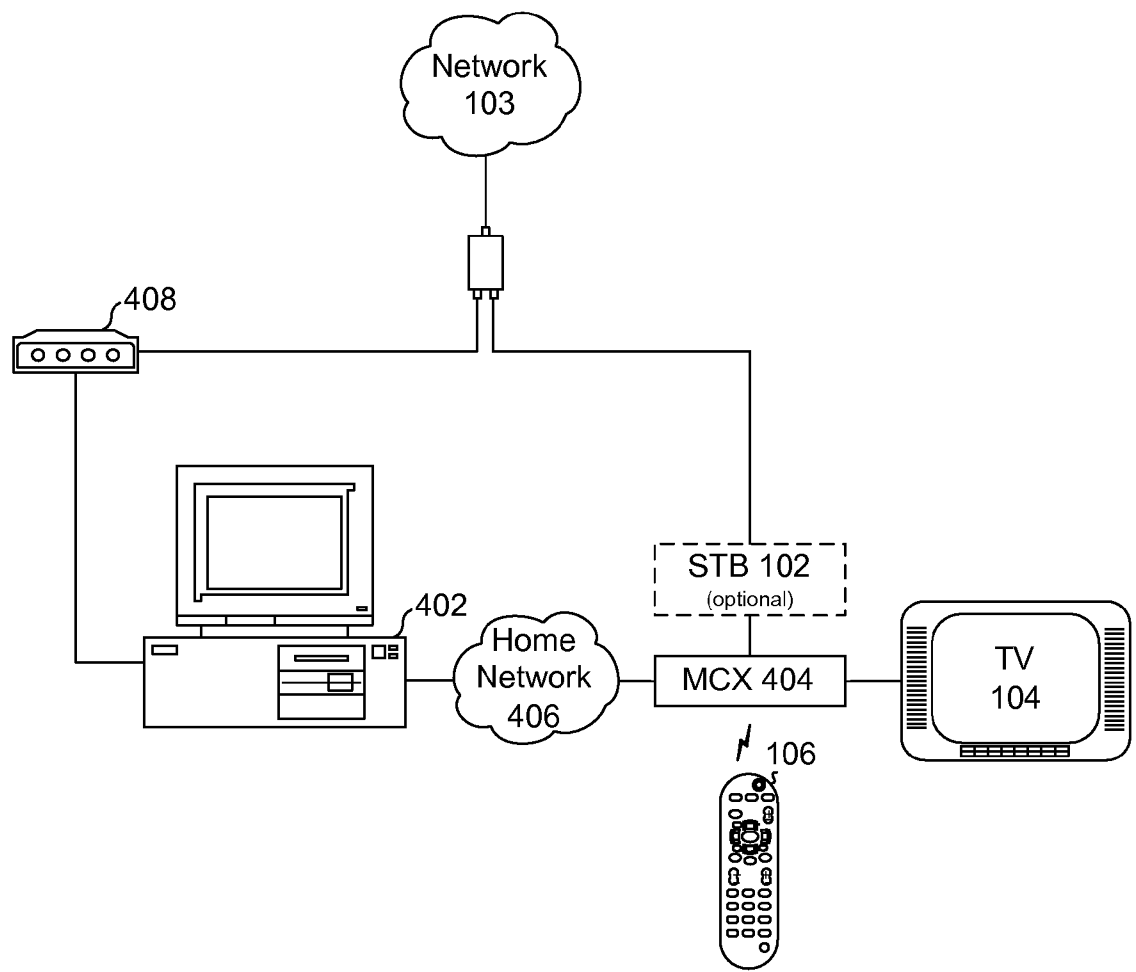
FIG. 4 is a block diagram of home entertainment system including a PC media center (PCMC) and a media center extension (MCX)

FIG. 4 is a block diagram of a home entertainment system 400 according to an embodiment of the invention that satisfies the demand for new ITV features without the cost of purchasing advanced STBs 302. In one configuration, a personal computer (PC) within a subscriber's home is transformed into a PC media center (PCMC) 402. In general, no hardware retrofitting is required. Rather, as explained in greater detail below, software programs are installed on the home PC to provide the media center functions.

In addition, a media center extension (MCX) 404 is provided. As described below, the MCX 404 includes many of the hardware components of an STB 102, but leverages the processing and storage capacity of the PCMC 402 to provide functionality comparable to an advanced STB 302 at a fraction of the cost.

The MCX 404 may be coupled to the PCMC 402 via an existing home network 406. The home network may be embodied as a 10/100 Mbps Ethernet, an 802.11b wireless network, a HomePNA™ network, a HomeCNA™ network, a HomePlug™ network, an IEEE 1394 network, a Bluetooth™ network, or any other suitable wired or wireless network.

As illustrated in FIG. 4, both the PCMC 402 and the MCX 404 may be coupled to the broadband network 103 in order to send and receive media content and other data. In certain configurations, the PCMC 402 may include an internal or external modem 408, such as a Motorola™ DOCSIS cable modem, for interfacing with the broadband network 103.

In various embodiments, the MCX 404 may be optionally coupled to a standard STB 102, such as a Motorola™ DCT2000™. As described in greater detail in connection with FIG. 7, the standard STB 102 may be used for channel tuning and conditional access (CA), which reduces the overall cost of the MCX 404 since hardware support for these features would not then be required within the MCX 404.

The MCX 404 may receive input from a standard IR or RF remote control 106. Likewise, the MCX 404 may produce output for a standard analog or digital TV 104 or similar display device.

Figure 5:
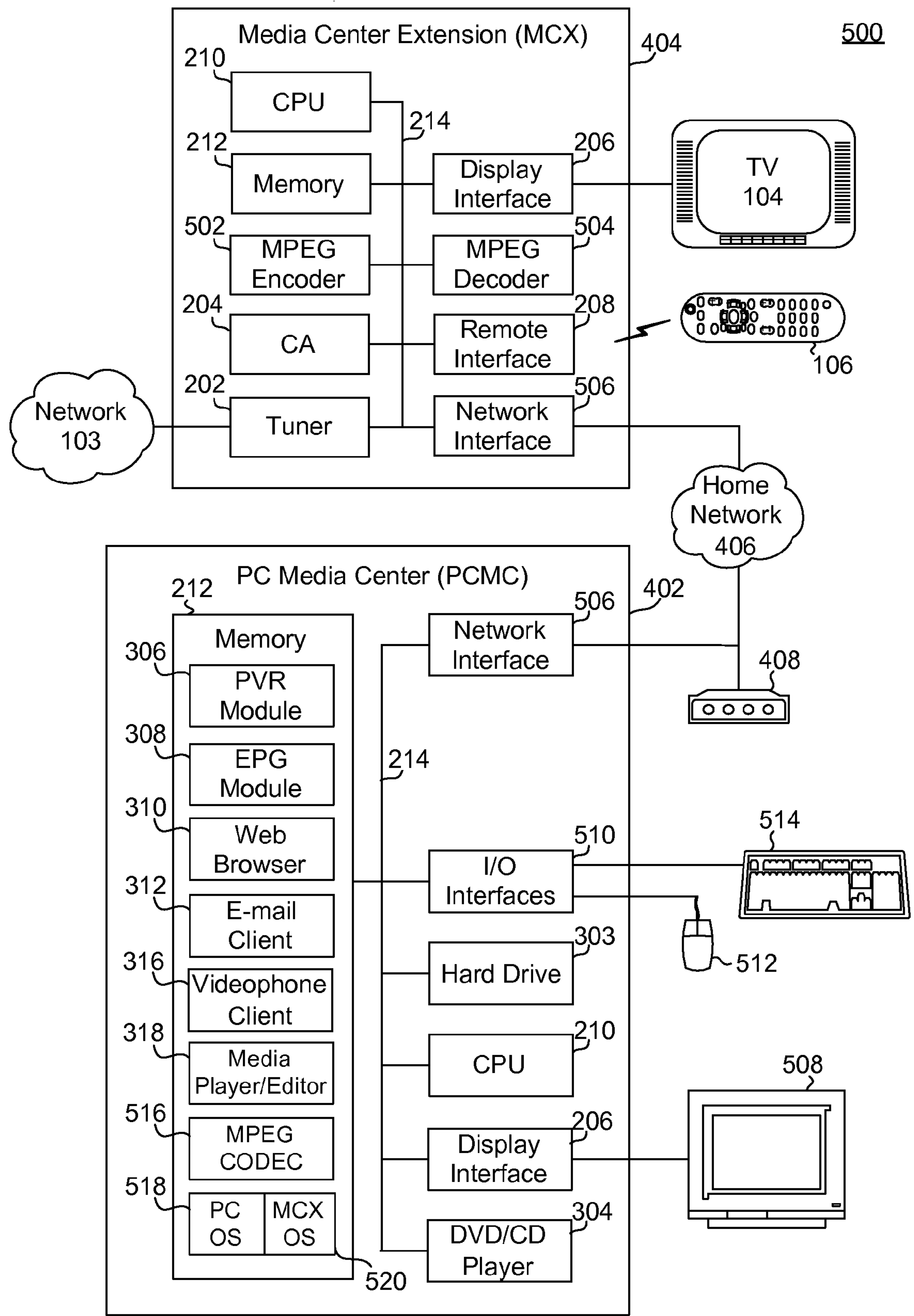
FIG. 5 is a block diagram of a home entertainment system showing details of a PCMC and MCX.

FIG. 5 is a detailed block diagram of a home entertainment system 500 according to an embodiment of the invention. As depicted, the MCX 404 may include components similar to those of a standard STB 102, including a tuner 202, CA device 204, display interface 206, remote interface 208, CPU 210, and memory 212, all of which may be interconnected via a bus 214.

In addition, the MCX 404 may include an MPEG encoder 502, such as an NEC™ µPD61xx encoder, for encoding or transforming audio/video signals received from the network 103 into media streams for transmission to the PCMC 402. The MCX 404 may also include an MPEG decoder 504 for decoding media streams received from the network 103 or the PCMC 402. The MPEG decoder 504 may be embodied as a separate MPEG decoding chip or as part of a display interface 206, such as an ATI™ Xilleon™ 215s. Of course, the MPEG encoder 502 and the MPEG decoder 504 may be embodied within a single chip or may be implemented using software.

While MPEG is used in a presently preferred embodiment, a variety of other encoding systems may be used within the scope of the invention, such as JPEG, JPEG-LS, H.261, and H.263. Accordingly, the invention should not be construed as being limited to MPEG encoding.

The MCX 404 may additionally include a network interface 506 for communicating with the PCMC 402 over the home network 406. The configuration of the network interface 506 will vary depending on the type of network 406. For instance, the network interface 506 may be embodied as a 10/100 Mbps Ethernet adapter, 802.11b adapter, an IEEE 1394 adapter, or the like.

The PCMC 402 may be implemented using a general purpose personal computer, such as a Dell™ Dimension™ 2200. Accordingly, the PCMC 402 may include various standard components similar to those of an advanced STB 302. For instance, the PCMC 402 may include a display interface 206 for driving a computer monitor 508, a CPU 210, a memory 212, a hard drive 303, a DVD/CD player 304, and so forth.

Furthermore, the PCMC 402 may include a network interface 506 for communicating with the MCX 404 over the home network 406. The network interface 506 may also be coupled to a modem 408 for communicating with the Internet 108 and/or the broadband network 103. Alternatively, the modem 408 may be included within the PCMC 402, itself, as an add-in board.

Additionally, the PCMC 402 may include various I/O interfaces 510 for communicating with various external devices. For instance, the PCMC 402 may include I/O interfaces 510 for receiving input from a mouse 512 and/or keyboard 514. Moreover, the PCMC 402 may include various standard I/O interfaces 510, such as serial ports, parallel ports, USB (universal serial bus) ports, IEEE 1394 (firewire) ports, and the like. All of the components of the PCMC 402 may be interconnected by a bus 214.

The memory 212 of the PCMC 402 may be configured with various software modules similar to those of the advanced STB 302. For instance, the memory 212 of the PCMC 402 may include a PVR module 306, an EPG module 308, a web browser 310, an e-mail client 312, a videophone client 316, and a media player/editor 318.

In addition, the memory 212 of the PCMC 402 may include an MPEG codec 516 (compressor/decompressor), which may be used to decode MPEG streams received from the MCX 404 as well as to encode MPEG streams to be sent to the MCX 404. While the MPEG codec 516 is depicted as a software component, a hardware implementation may be used within the scope of the invention. In such an embodiment, an add-in card, such as the Canopus™ MVR1000™ hardware MPEG-2 encoder, may be provided.

In addition to a PC operating system (OS) 518, such as Windows XP™, the memory 212 of the PCMC 402 may include an OS 520 for the MCX, such as Linux™. In certain configurations, the MCX 404 may boot (i.e., load the OS 520 into memory 212) from a copy stored within the PCMC 402. For instance, the network interface 506 of the MCX 404 may be compatible with the 3Com™ DynamicAccess™ managed PC boot agent or other network boot service. This eliminates the need for the MCX 404 to locally store the MCX OS 520 within a flash memory or hard drive 303.

Figure 6:
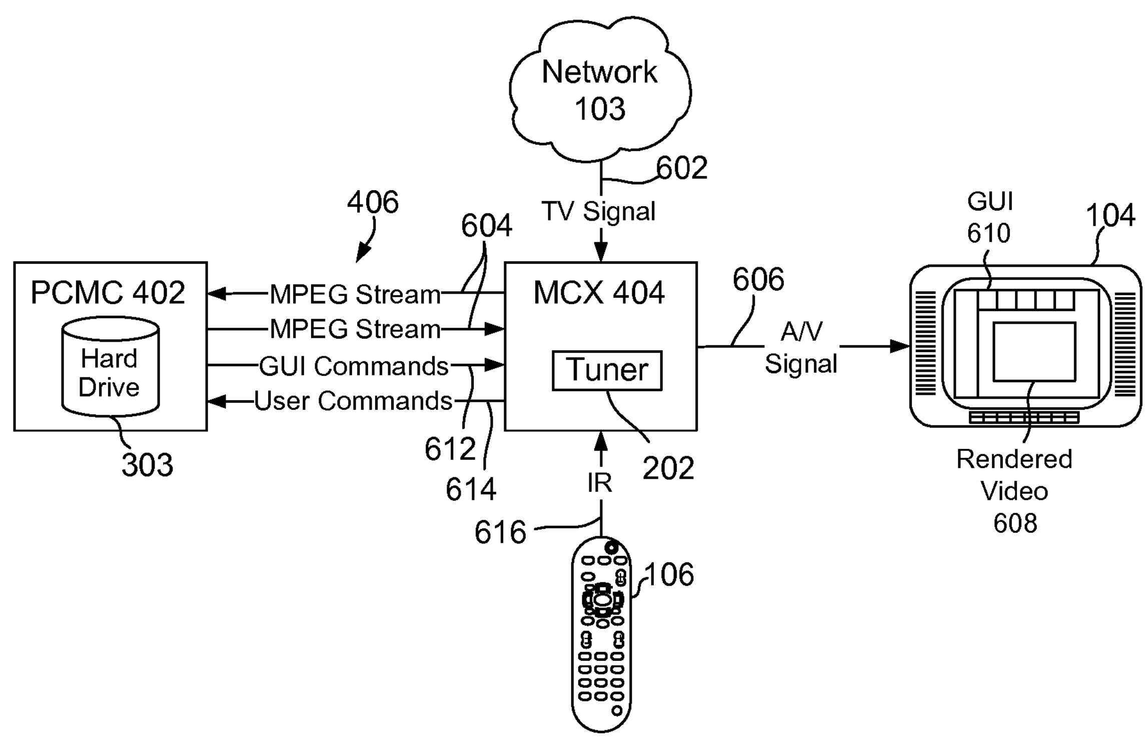
FIG. 6 is a dataflow diagram of the system of FIG. 5.

FIG. 6 depicts the flow of data through the system 500 of FIG. 5. As illustrated, a media signal 602, such as a TV signal, is received by a tuner 202 of an MCX 404 from the network 103. The media signal 602 may be an analog TV signal, a "digital" cable or satellite TV signal, a Video-on-Demand (VoD) signal, or other transmission.

In one configuration, the MCX 404 encodes the media signal 602 into an MPEG stream 604 and sends the MPEG stream 604 via the home network 406 to the PCMC 402. Within the PCMC 402, the MPEG stream 604 is recorded or stored in a hard drive 303, memory, or other digital storage device.

Once stored, the MPEG stream 604 may be used or manipulated in a variety of ways. For instance, the MPEG stream 604 may be edited using the media player/editor 318, sent to another subscriber using the videophone client 316 or the e-mail client 312, indexed for subsequent playback by the PVR module 306, etc.

In one configuration, a stored MPEG stream 604 is retrieved from the hard drive 303 and transported via the home network 406 to the MCX 404. The retrieved MPEG stream 604 may be one that was recorded by the PVR module 306, edited by the media player/editor 318, etc. Within the MCX 404, the MPEG stream 604 is decoded by the MPEG decoder 504 and converted by the display interface 206 into an A/V (audio/video) signal 606, which may be displayed as rendered video 608 on the TV 104.

In addition, the PCMC 402 may be responsible for creating and updating a graphical user interface (GUI) 610 on the TV 104. To accomplish this, the PCMC 402 sends GUI commands 612 to the MCX 404, which are used by the display interface 206 to generate the GUI 610. The GUI commands 612 may be embodied, for instance, as low-level VGA (Video Graphics Array) commands which may be directly processed by circuitry within the display interface 206. Alternatively, the GUI commands 612 may be graphical primitives understood by a thin-client module (not shown) within the MCX 404. In still other embodiments, the GUI commands 612 may include higher-level data objects, such as graphics and text.

The GUI 610 may provide an interface to various modules within the PCMC 402, such as the PVR module 306, EPG module 308, web browser 310, e-mail client 312, videophone client 316, media player/editor 318, or the like. For instance, the GUI 610 may display a listing of TV programs recorded by the PVR module 306 and allow a subscriber to select one or more of the TV programs for playback, deletion, etc. Likewise, the GUI 610 may display content retrieved by the web browser 310 from the Internet 108.

The PCMC 402 may be further responsible for receiving input from the remote control 106 and relaying certain user commands 614 or requests to the PCMC 402. For instance, the remote control 106 may send an IR command 616 to the MCX 404 in response to the user pressing a button. The IR command 616 is processed by the MCX 404 and, in certain configurations, relayed to the PCMC 402 as a user command 614.

As an example, suppose the TV signal 602 contains a TV program that is scheduled to be recorded by the PVR module 306 of the MCX 404. The MCX 404 encodes the TV signal 602 into an MPEG stream 604, which is sent to the PCMC 402 where it is stored within the hard drive 303.

Later, a subscriber desires to watch the recorded TV program. The subscriber presses a designated button on the remote control for displaying the GUI 610 on the TV 104. An IR command 616 is sent to the MCX 404, which sends a corresponding user command 614 to the PCMC 402. In turn, the PCMC 402 generates GUI commands 612, which are sent to the MCX 404 and rendered as the GUI 610 on the TV 104.

Navigating the GUI 610 by means of the remote control 106, the subscriber initiates a command to display the recorded TV program. The PCMC retrieves or reads the appropriate MPEG stream 604 from the hard drive 303 and sends the same to the MCX 404 where it is rendered and displayed on the TV 104.

Figure 7:
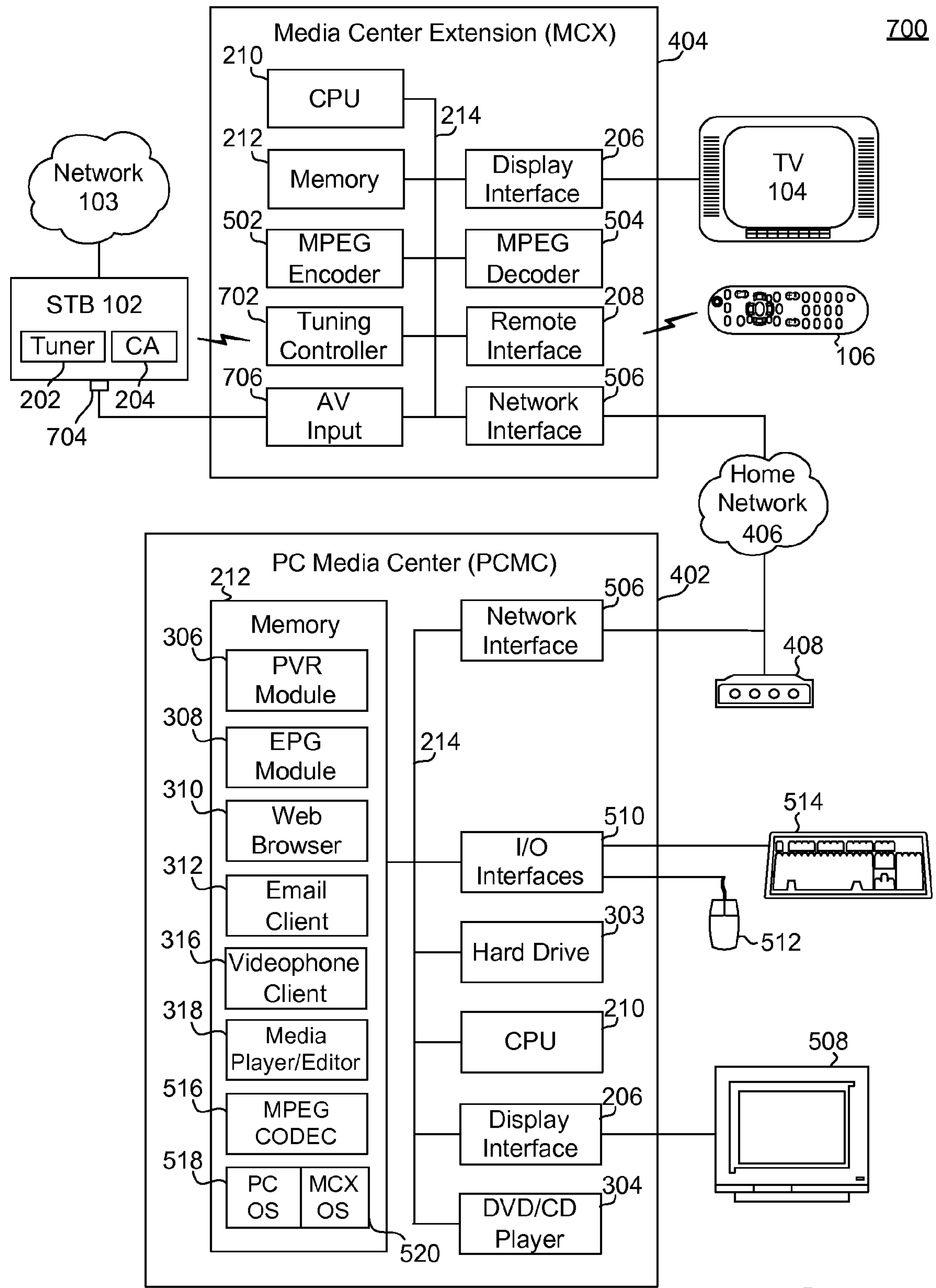
FIG. 7 is a detailed block diagram of an alternative home entertainment system showing details of a PCMC and MCX.

FIG. 7 is a detailed block diagram of a home entertainment system 700 according to an alternative embodiment of the invention. As previously explained, the MCX 404 may be optionally coupled to a standard STB 102, such as a Motorola™ DCT2000™. In such an embodiment, the standard STB 102 is leveraged for its tuner 202 and CA device 204, eliminating the need for such components within the MCX 404. Accordingly, the currently-installed base of standard STBs 102 need not be replaced and the overall cost of the MCX 404 is thereby reduced.

As depicted, the MCX 404 includes a remote tuning controller 702 for controlling the tuning of the STB 102. In one embodiment, the remote tuning controller 702 simulates a remote control 106 by transmitting appropriate tuning control signals to the STB 102. The remote tuning controller 702 may be embodied, for instance, as an IR emitter (e.g., IR Blaster™), which simulates a remote control 106 by emitting IR commands similar to those of the remote control 106. In alternative embodiments, the remote tuning controller may include a serial cable and suitable driving hardware for transmitting tuning control signals directly to a serial port of the STB 102. The Motorola™ DCT2000™, for example, includes such a serial port for receiving tuning control signals.

Conventionally, an A/V output 704 of the STB 102 is connected to the TV 104. However, in the depicted embodiment, the A/V output 704 of the STB 102 is coupled to an A/V input 706 of the MCX 404. Thus, the MCX 404 receives the same A/V signals that would normally have been received by the TV 104. Various types of A/V connections may be used depending on the capabilities of the STB 102, e.g., composite video, s-video, component video, stereo audio, optical/coaxial digital audio, RF audio/video, etc.

Figure 8:
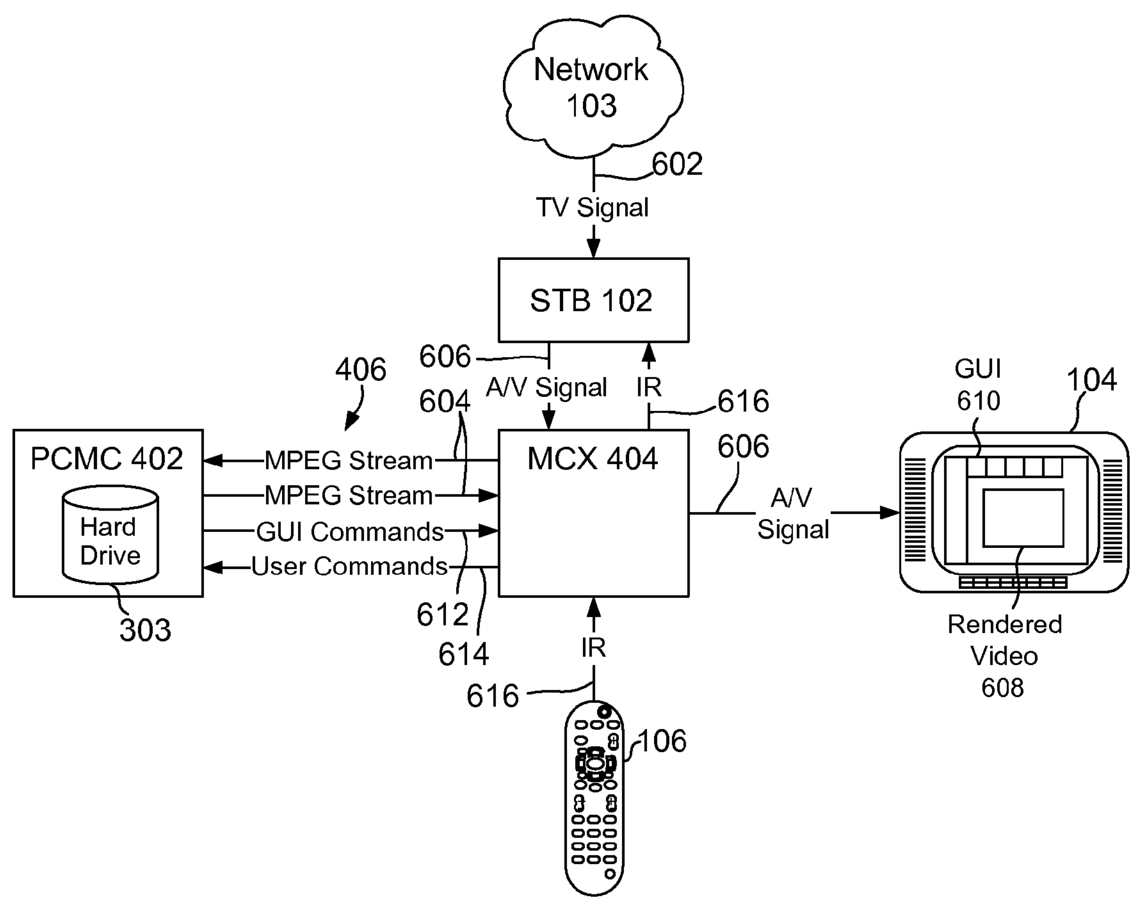
FIG. 8 is a dataflow diagram of the system of FIG. 6.

FIG. 8 depicts the flow of data through the system 700 of FIG. 7. The dataflow of FIG. 8 is similar to that of FIG. 6, except that the TV signal 602 is first received by the STB 102 rather than the MCX 404. The STB 102 generates an A/V signal 606, which is received by the MCX 404. Thereafter, the A/V signal 606 may be encoded, displayed, etc., as described with reference to FIG. 6.

The MCX 404, in turn, controls the tuning of the STB 102 with tuning command signals, e.g. IR commands 616. Thus, the STB 102 becomes an extension of the MCX 404, performing tuning and conditional access functions, while the MCX 404 can be reserved for encoding/decoding tasks and interfacing with the PCMC 402.

Figure 9:
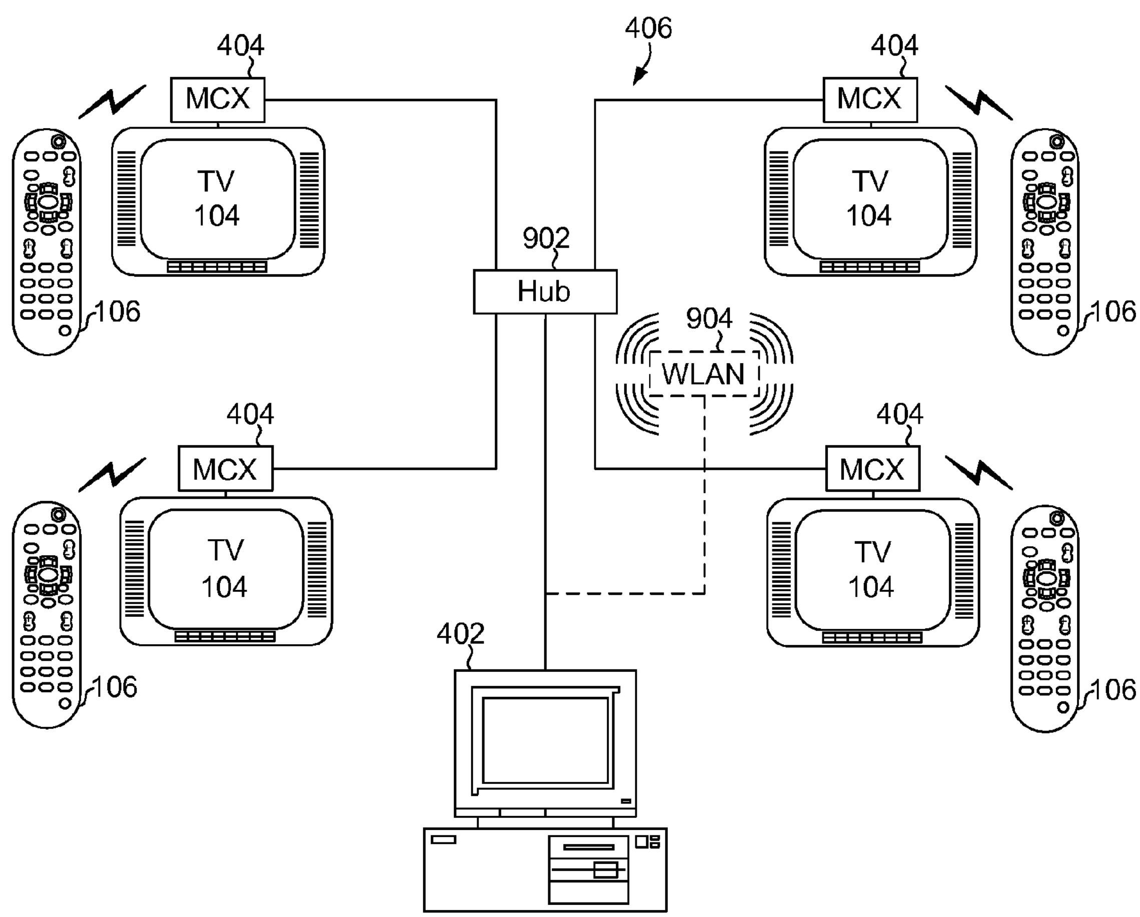
FIG. 9 is a block diagram of a home entertainment system including multiple televisions.

As shown in FIG. 9, a home entertainment system 900 may include any number of MCXs 404. For instance, a plurality of MCXs 404 may be in communication with a PCMC 402 via a hub 902 or wireless LAN 904 (WLAN). Each MCX 404 may be coupled to a separate TV 104 and have a separate remote control 106. Accordingly, an entire household may be serviced by a single PCMC 402, which would not be possible conventionally with an advanced STB 302.

Figure 10:
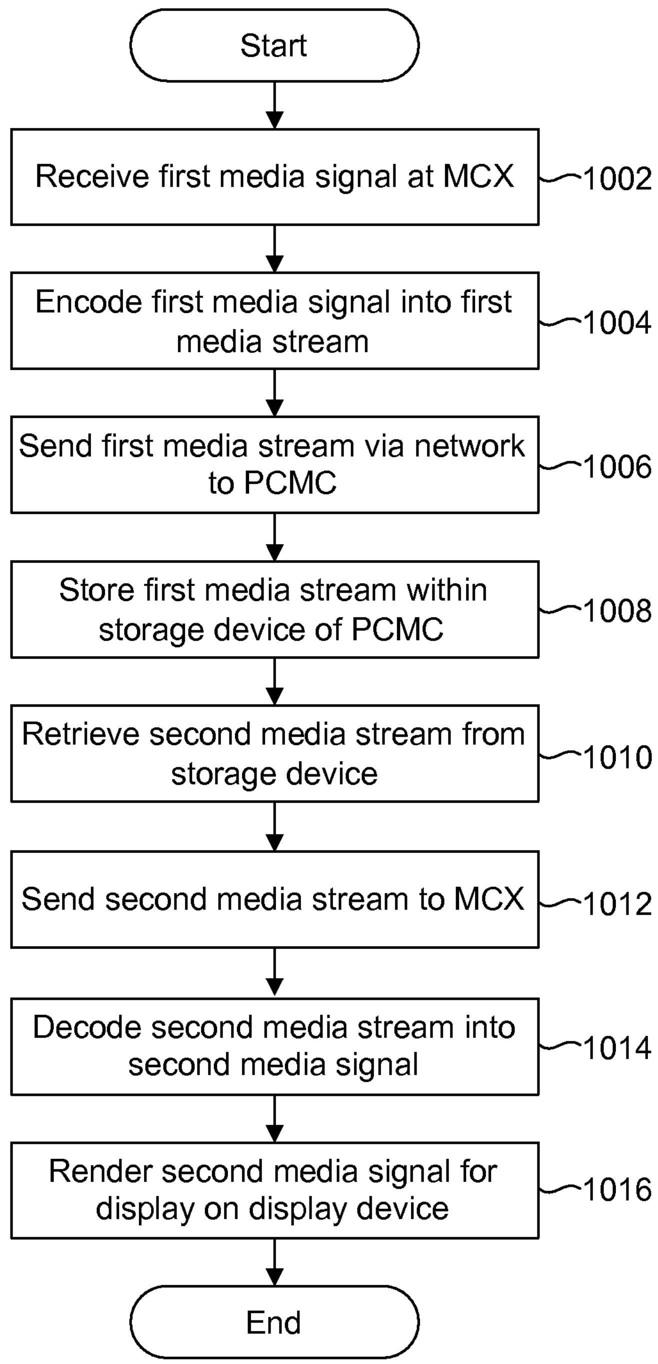
FIG. 10 is a flowchart of a method performed by a home entertainment system.

FIG. 10 is a flowchart of a method 1000 within a home entertainment system for processing and displaying media signals 602. A first media signal (e.g., TV signal) 602 is received 1002 at an MCX 404. Thereafter, the first media signal 602 is encoded 1004 into a first media stream 604 (e.g., MPEG or other data stream), which is sent 1006 via a home network 406 to a PCMC 402. The first media stream 604 is then stored 1008 within a storage device (e.g., hard disk) 303 of the PCMC 402.

Subsequently, a second media stream 604 is retrieved 1010 from the storage device 303 and sent 1012 to the MCX 404. The second media stream 604 may include or may be adapted from the first media stream 604. For instance, the second media stream 604 may be an edited version of the first media stream 604. Within the MCX 404, the second media stream is decoded 1014 and rendered 1016 for display on a television 104 or other display device.

As previously noted, the PCMC 402 may be responsible for creating and updating a graphical user interface (GUI) 610 on the TV 104. To accomplish this, the PCMC 402 sends GUI commands 612 to the MCX 404, which are used by the display interface 206 to generate the GUI 610.

Figure 11:
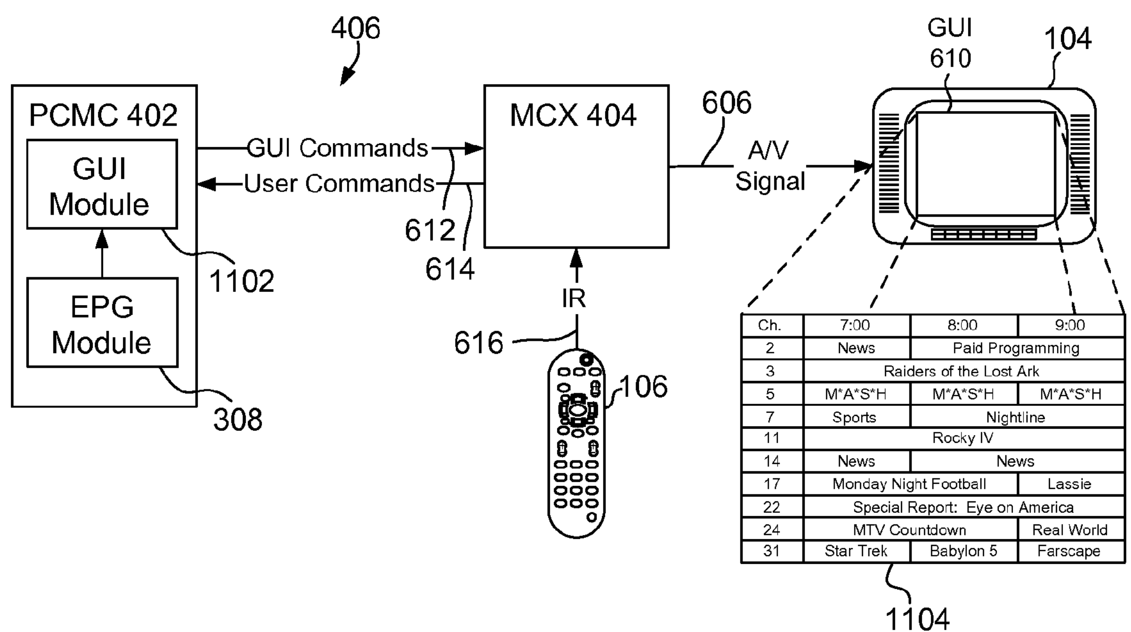
FIG. 11 is a block diagram of a Graphical User Interface (GUI) module for generating a GUI on a display device attached to an MCX.

As shown in FIG. 11, a GUI module 1102 within the PCMC 402 may be responsible for generating the appropriate GUI commands 612 that are used by the MCX 404 to display the GUI 610. The GUI commands 612 may be embodied, for instance, as low-level VGA (Video Graphics Array) commands which may be directly processed by circuitry within the display interface 206. Alternatively, the GUI commands 612 may be graphical primitives understood by a thin-client module (not shown) within the MCX 404. Various thin-client architectures are known in the art, such as Citrix™. In still other embodiments, the GUI commands 612 may include higher-level data objects, such as graphics and text.

In one embodiment, the GUI module 1102 generates GUIs 610 to interface with various software modules within the PCMC 402, such as the PVR module 306, EPG module 308, web browser 310, e-mail client 312, videophone client 316, media player/editor 318, etc. For instance, in the depicted embodiment, the GUI module 1102 is in communication with the EPG module 308 and generates GUI commands 612 for displaying an GUI 610 including an EPG (Electronic Program Guide) 1104.

As previously noted, an EPG 1104 is a listing of current or upcoming TV programming. Typically, an EPG 1104 is displayed in a grid format, with rows and columns corresponding to either time segments or TV channels. EPGs 1104 of the type illustrated are disclosed in U.S. Pat. No. 5,479,266 to Young et al.

Another GUI 610 that may be generated by the GUI module 1102 for display on a TV 104 is discussed with reference to FIGS. 12-19. As previously noted, a home entertainment system 500, 700 may provide access to a plurality of selectable options, such as TV channels, programs, applications, digital media files, etc. For instance, a system 500, 700 may provide access to literally hundreds of broadcast TV channels, pay-per-view (PPV) channels, Video-on-Demand (VoD) streams, music channels, data feeds, web pages, stored PVR recordings, digital photographs, audio (MP3) files, and the like.

Figure 12:
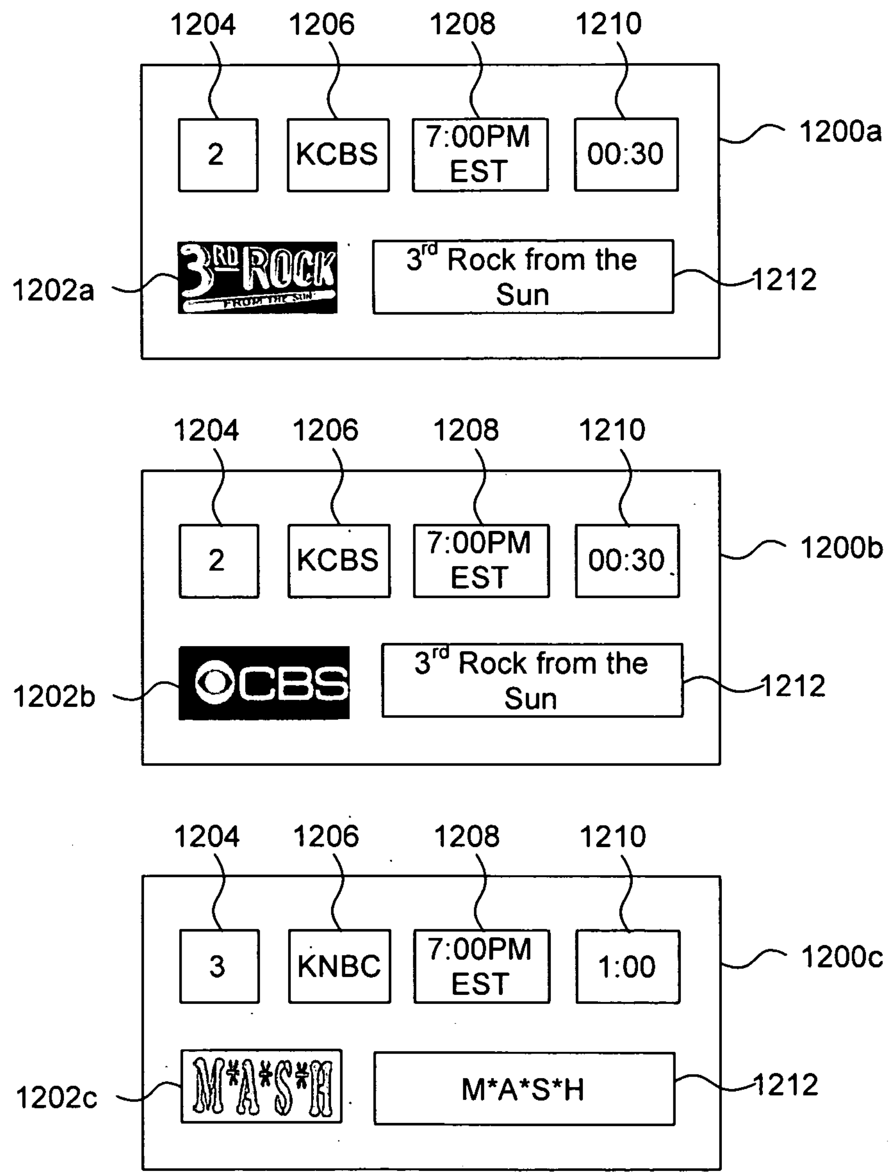
FIG. 12 is a block diagram of a plurality of cards.

As shown in FIG. 12, each selectable option may be associated with a card 1200. A card 1200 is an object or other suitable data structure that provides information about and/or access to an available option within a system 500, 700. A card 1200 may be a container of all of the attributes, actions, and/or states needed to facilitate interaction with the option represented thereby. Cards 1200 may be stored in any suitable format within a memory or disk drive of a system 500, 700.

Each card 1200 may include a graphical representation 1202 for display in the GUI 610, as described in detail below. The graphical representation 1202 may include various types or combinations of artwork, digital photography, captured video frames, animations, or the like.

As depicted in FIG. 12, cards 1200*a-c* may be used to represent television programs or channels. The television programs may be ongoing (live), upcoming, or previously-recorded (e.g., buffered by the PVR module 306 using the hard drive 303). In addition to a graphical representation 1202, such cards 1200 may include, for instance, a channel number 1204, a channel name or identifier 1206, a starting time 1208, a running time 1210, and a text description 1212. Of course, cards 1200 representing other types of options may include additional or different types of information, such as audio/video clips, file or path names, network addresses (URLs), etc.

The graphical representations 1202 associated with cards 1200 may have different levels of specificity or granularity. For instance, a graphical representation 1202*a* may correspond generally to a television series, e.g., "3rd Rock from the Sun", while another graphical representation 1202*b* may correspond to a television station or network, e.g., "CBS". In other embodiments, a graphical representation 1202 may correspond to a specific episode of a television series (e.g., a series premier). In still other embodiments, a generic graphical representation 1202 may be provided, which may be overlaid by the channel number 1204, text description 1212, or other information, where a more specific card 1200 is not available.

Cards 1200 may be generated locally within a PCMC 402 or may be received by the PCMC 402 through the network 103 using HTTP (hypertext transfer protocol), FTP (file transfer protocol), ATVEF (advanced television enhancement forum) triggers, etc. In one embodiment, a card 1200 may be received with data encoded in the vertical blanking interval (VBI) of a television signal. Additionally, information associated with cards 1200 (e.g., channel number 1204, starting time 1208, running time 1210) may be dynamically updated with information received in ATVEF triggers.

Figure 13:
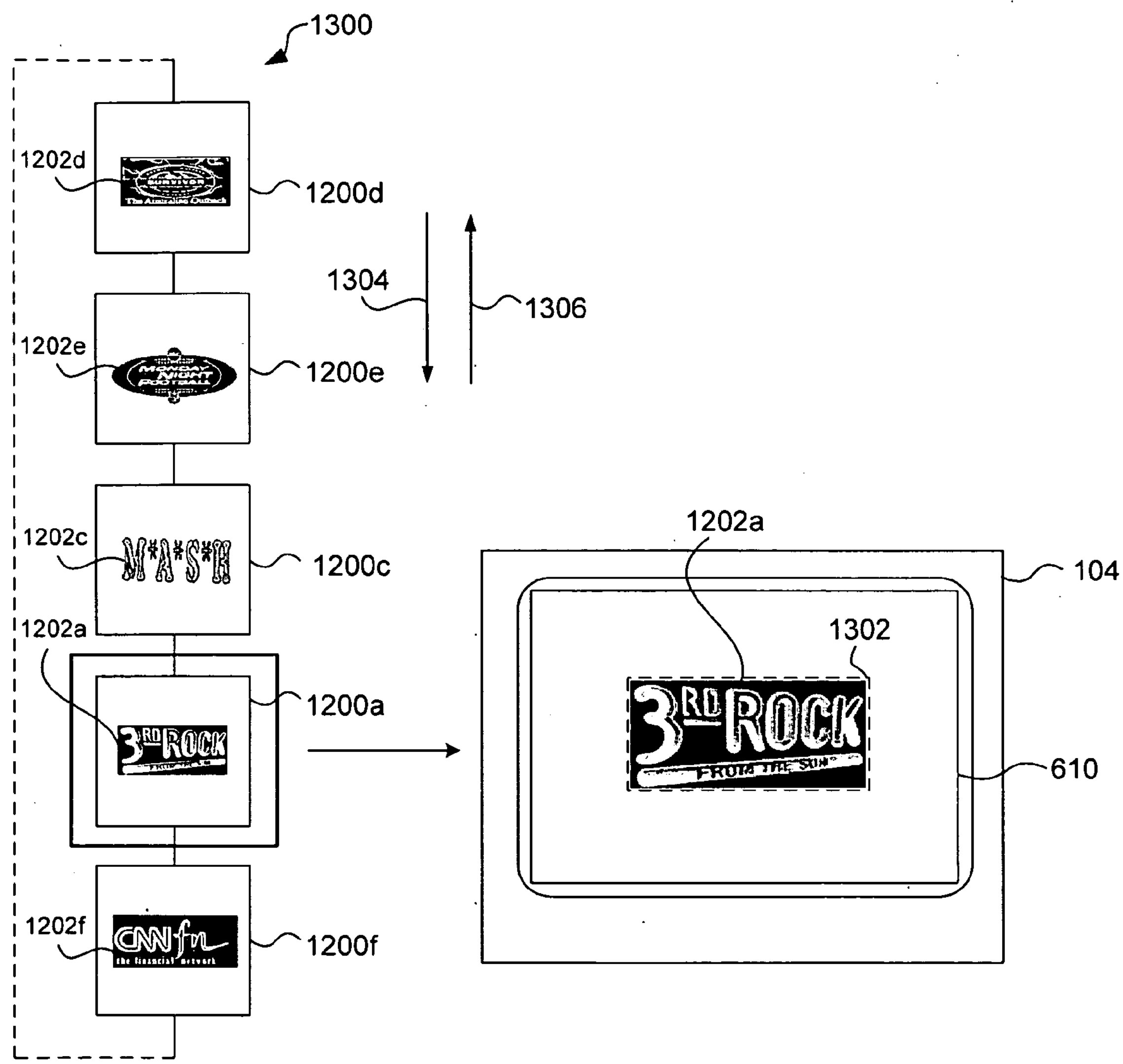
FIG. 13 is a block diagram of a sequence of cards to be successively displayed within a focus area of a GUI.

Referring to FIG. 13, a plurality of cards 1200 may be linked or grouped together in a package or sequence 1300. The sequence 1300 may be circular (as depicted), linear, or configured in other ways. The sequence 1300 may be linked in numerical order by channel number 1204, in alphabetical order by the text description 1212, or in other preset or user-defined ways. For instance, the sequence 1300 may be determined based on one or a combination of other inputs, such as user profile information, user preferences, external events or data feeds (e.g., telephone rings, PVR notifications, alerts for external programming sources).

In the illustrated embodiment, one card 1200*a* in the sequence 1300 is active or in "focus". As shown, the active card 1200*a* may be displayed within a focus area 1302 of a GUI 610 displayed on the TV 104. For brevity, the phrase "displaying a card" refers herein to displaying a graphical representation 1202 associated with the card 1200. Other information associated with the card, e.g., the channel number 1204 or text description 1212, may or may not be displayed.

A focus area 1302 is a single location of the GUI 610 at which the cards 1200 are successively displayed (displayed one at a time in sequence). The focus area 1302 may be located at a central or visually dominant location of the GUI 610, although the invention is not limited in this respect. As used herein, the term "focused navigation" refers to a technique of displaying a sequence 1300 of cards 1200 within a focus area 1302.

In response to a single initiating action by a user, the cards 1200 in a sequence 1300 are successively displayed within the focus area 1302. Where the sequence 1300 is circular, the successive display of cards 1200 may continue indefinitely until halted by the user by a subsequent action, as described more fully below.

The single user action to initiate navigation may be pressing (or pressing and holding down) a button on the remote control 106. For example, the user may press an "Up" button to initiate the successive display in a first direction within the sequence 1300 (indicated by line 1304), and press a "Down" button to initiate navigation in the opposite direction (indicated by line 1306). Alternatively, the user may speak a command into a microphone (either within the MCX 1304 or remote control 106) to initiate navigation. Of course, the user may initiate navigation in a variety of other ways within the scope of the invention.

In one embodiment, the sequence 1300 of cards 1200 is successively displayed at a rate selected by the user. For instance, initially pressing the "Up" button may cause the sequence 1300 to be displayed at a rate of two cards 1200 per second. As the user continues to hold the "Up" button, the rate may increase gradually or in steps to any practical rate within the limit of a typical user's ability to recognize individual cards 1200 when they are displayed. Many users are able to recognize individual cards 1200 at a rate of seven or more cards 1200 per second (420 per minute), facilitating rapid navigation of available options.

The cards 1200, when displayed within the focus area 1302, may be sufficiently large to permit user recognition from a comfortable viewing distance for the particular TV 104. Thus, unlike PC icons, which typically occupy as little as 1/200 of the display area of the TV 104, the displayed cards 1200 (and the card 1200 in the focus area 1302 in particular) may occupy between 1/10 and 1/4 of the total display area.

When the user sees a card 1200 being displayed of a channel or option that she desires to select or view, the user may take some additional terminating action and the successive display of cards 1200 is halted. For example, where navigation was initiated by pressing and holding down the "Up" button, the user may release the "Up" button to discontinue navigation. In an alternative embodiment, where the successive display was initiated simply by pressing a button, the user may press the same or a different button to halt the successive display. Of course, the user may discontinue navigation in a variety of other ways within the scope of the invention.

If the user's reaction time is fast enough, the card 1200 representing the desired channel remains displayed in the focus area 1302 once navigation is discontinued. However, the user's reaction time may not be fast enough and one or more cards 1200 may be subsequently displayed. In such a case, the user may manually backtrack to the desired card 1200 by repeatedly activating a suitable control on the remote control 106. For example, briefly pressing the "Up" or "Down" buttons may result in the previous or next card 1200, respectively, being displayed. Alternatively, as described in greater detail below, the system may attempt to determine the delay between the user recognizing the desired card 1200 and taking the subsequent action and compensate for that delay by reverting to a previously-displayed card 1200.

The user may select the channel or option associated with the displayed card 1200 by taking a selection action. For instance, the user may press a "Select" button on the remote control 106. Alternatively, the selection action may simply be waiting a set amount of time without activating any controls on the remote control 106.

The effect of activating the card 1200 will vary depending on the type of card 1200. For instance, in the case of a card 1200 representing a live television program, the GUI 610 may be replaced by a full-size version of the program. Alternatively, activating a card 1200 corresponding to a purchase opportunity may result in the display of a web browser directed to a particular website.

Figure 14:
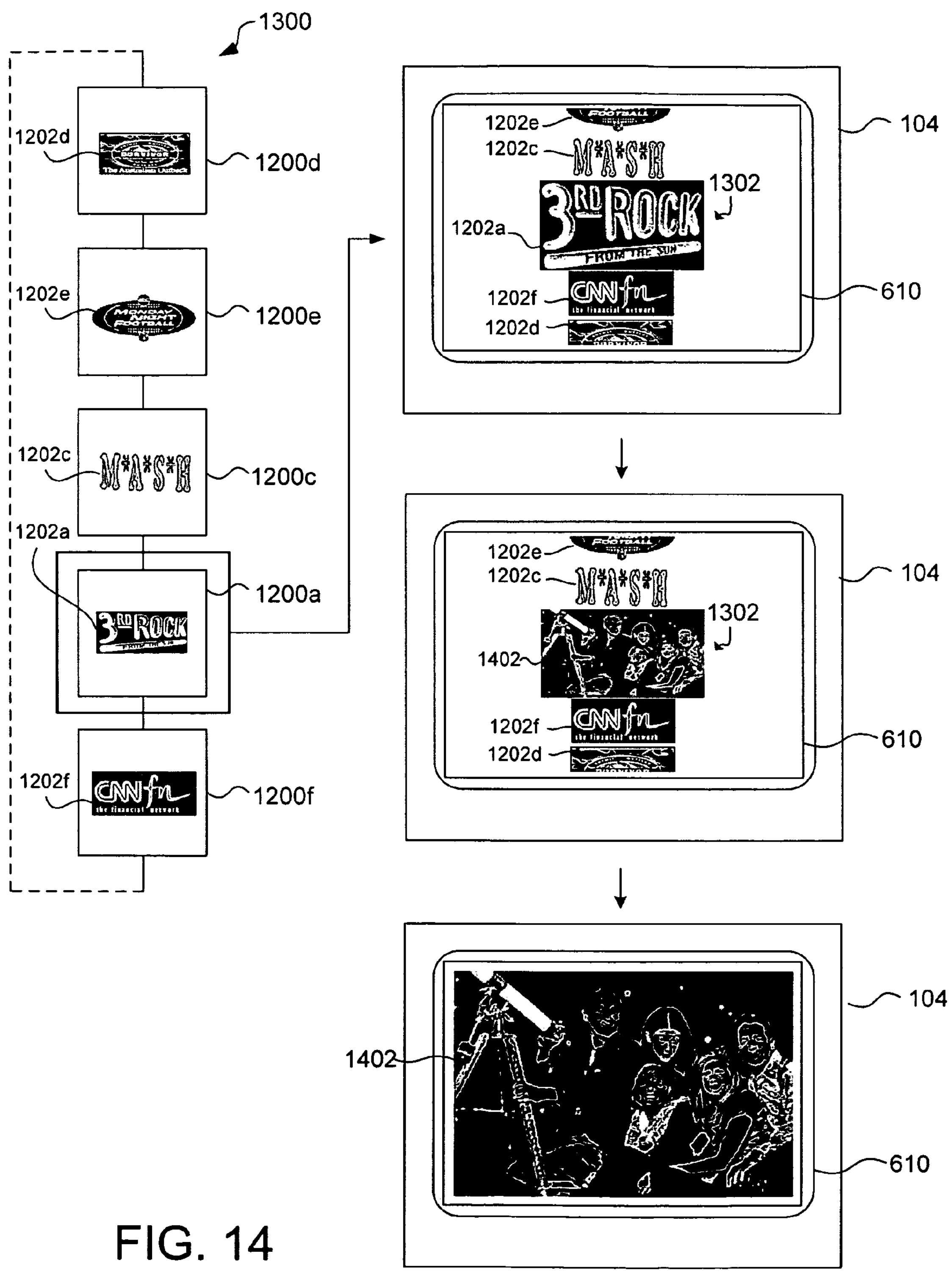
FIG. 14 is a block diagram of a sequence of cards being displayed along an axis of a GUI.

As shown in FIG. 14, one or more previous and next cards 1200 within the sequence 1300 may be displayed along an axis (not shown) of the GUI 610 to provide the user with a more complete navigational context within the sequence 1300. In one embodiment, the axis is an imaginary line that extends across the GUI 610 in a particular direction and intersects the focus area 1302. For example, at least a subset of the sequence 1300 of cards 1200 may be displayed along a vertical axis, with the active card 1200*a* being displayed in the focus area 1302. In alternative embodiments, the cards 1200 may be displayed along horizontal or diagonal axes, or in other suitable ways.

When a user activates one of the navigation buttons of the remote control 106 (e.g., the "Up" or "Down" buttons), the displayed cards 1200 in the sequence 1300 may be scrolled (e.g., shifted or cycled) downward or upward, respectively, with a new card (e.g., card 1200*c* or 1202*f*) entering the focus area 1302. Alternatively, "Left" or "Right" button, if available, may be used for the same purpose.

As depicted, the card 1200*a* in the focus area 1302 may be visually emphasized in various ways. For example, the card 1200*a* may be enlarged relative to the other displayed cards 1200. Alternatively, the card 1200*a* may be animated, marked, illuminated, highlighted, or otherwise set apart from the other cards 1200.

In certain embodiments, if the user allows a card 1200 representing a live television program to remain in the focus area 1302 for a certain amount of time (e.g., 2 seconds), the card 1200*a* may be overlaid by a video window 1402 showing the live television program. Furthermore, if the user continues to linger on the card 1200*a* (or if the user presses the "Select" button), the video window 1402 may be enlarged 1402 to fill the entire TV 104. Other types of cards 1200 may exhibit different types of behaviors when the card 1200 remains in the focus area 1302 for an established period of time.

Where the cards 1200 represent live television programs, a card 1200 corresponding to the currently-tuned channel (at the current date and time) may be selected by default for display in the focus area 1302 each time the GUI 610 is shown. This may occur, for instance, when the user is watching TV and presses a button (such as the "Select" button 124) in order to display the GUI 610. Additionally, an indication of the currently-displayed card 1200 in the focus area 1302 may be stored in non-volatile memory or otherwise maintained such that if a reset condition occurs (e.g., the STB 106 is rebooted or reset after a power loss, etc.) the last-displayed card 1200 may be restored to the focus area 1302.

Figure 15:
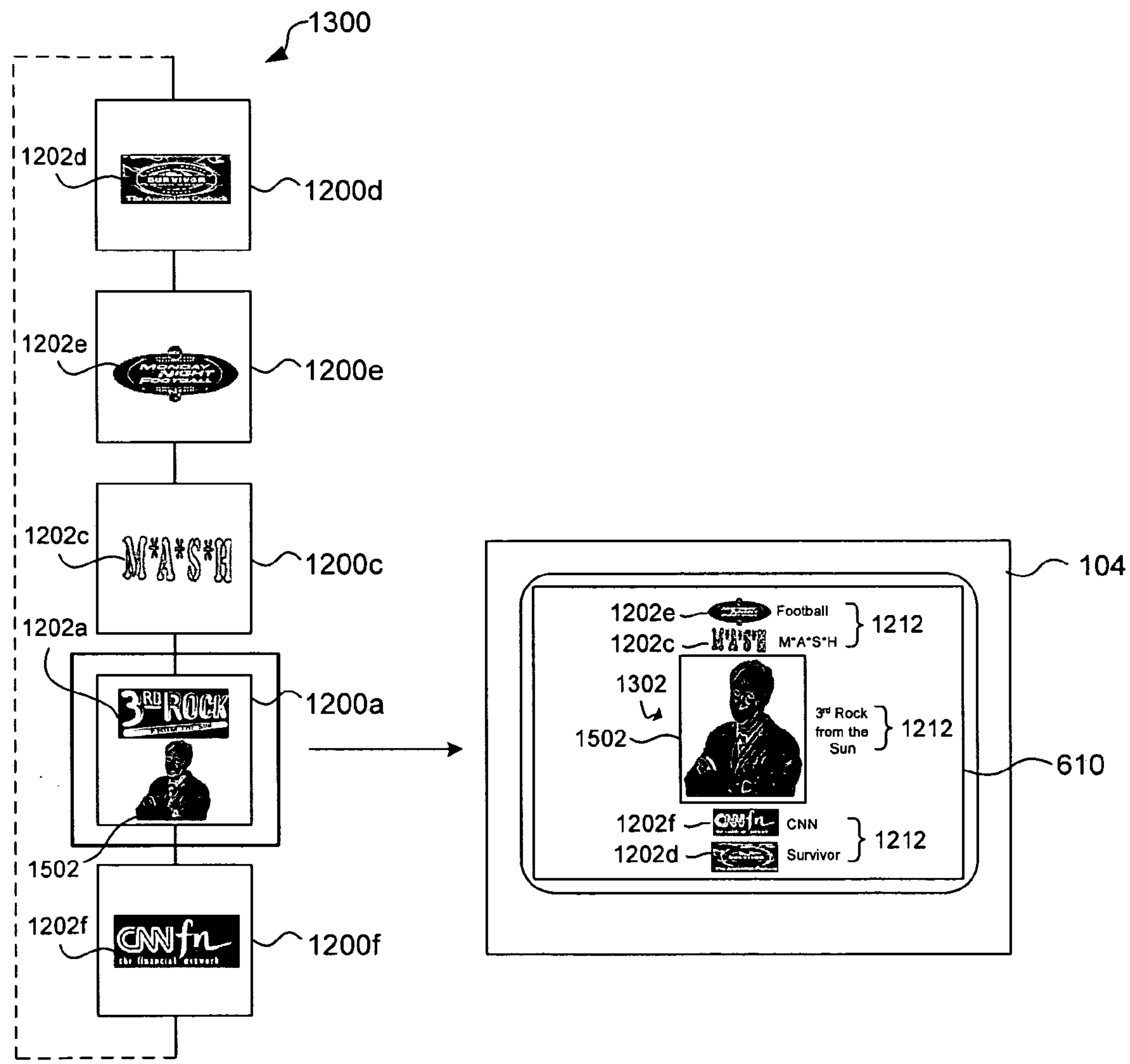
FIG. 15 is a block diagram of a card including an alternative graphical image.

Referring to FIG. 15, cards 1200 may include one or more alternative graphical representations 1502, which may be displayed when the card 1200 enters the focus area 1302. As depicted, cards 1200*c-f* displayed outside of the focus area 1302 are shown using a first graphical representation 1202*c-f*. However, when the card 1200*a* enters the focus area 1302, the alternative graphical representation 1502 is shown. Providing an alternative graphical representation 1502 allows a designer to provide a more detailed or higher-resolution image for display in the focus area 1302, which may be enlarged relative to other graphical representations 1202 outside of the focus area 1302.

In certain implementations, various types of supplemental information, such as text descriptions 1212, may be displayed next to the graphical representations 1202, 1502 in the GUI 610 to aid the user in identifying and knowing the status of the corresponding options. Sometimes a graphical representation 1202 may simply be a picture or logo, which may not be familiar to every user. The addition of a text description 1212 is helpful in such cases.

The text description 1212 may be displayed above, below, or to the side of the graphical representation 1202, 1502. Moreover, the text may be of a suitably large size to be easily discernable by the user from a normal viewing distance. During navigation, the text descriptions 1212 are shifted or cycled with the corresponding graphical representations 1202, 1502.

In the depicted embodiment, the text descriptions 1212 identify a television programs or series, and are shown to the right of the corresponding graphical representations 1202. Of course, many other types of text descriptions 1212 may be provided, and different placements or orientations of the text descriptions 1212 are contemplated.

Figure 16:
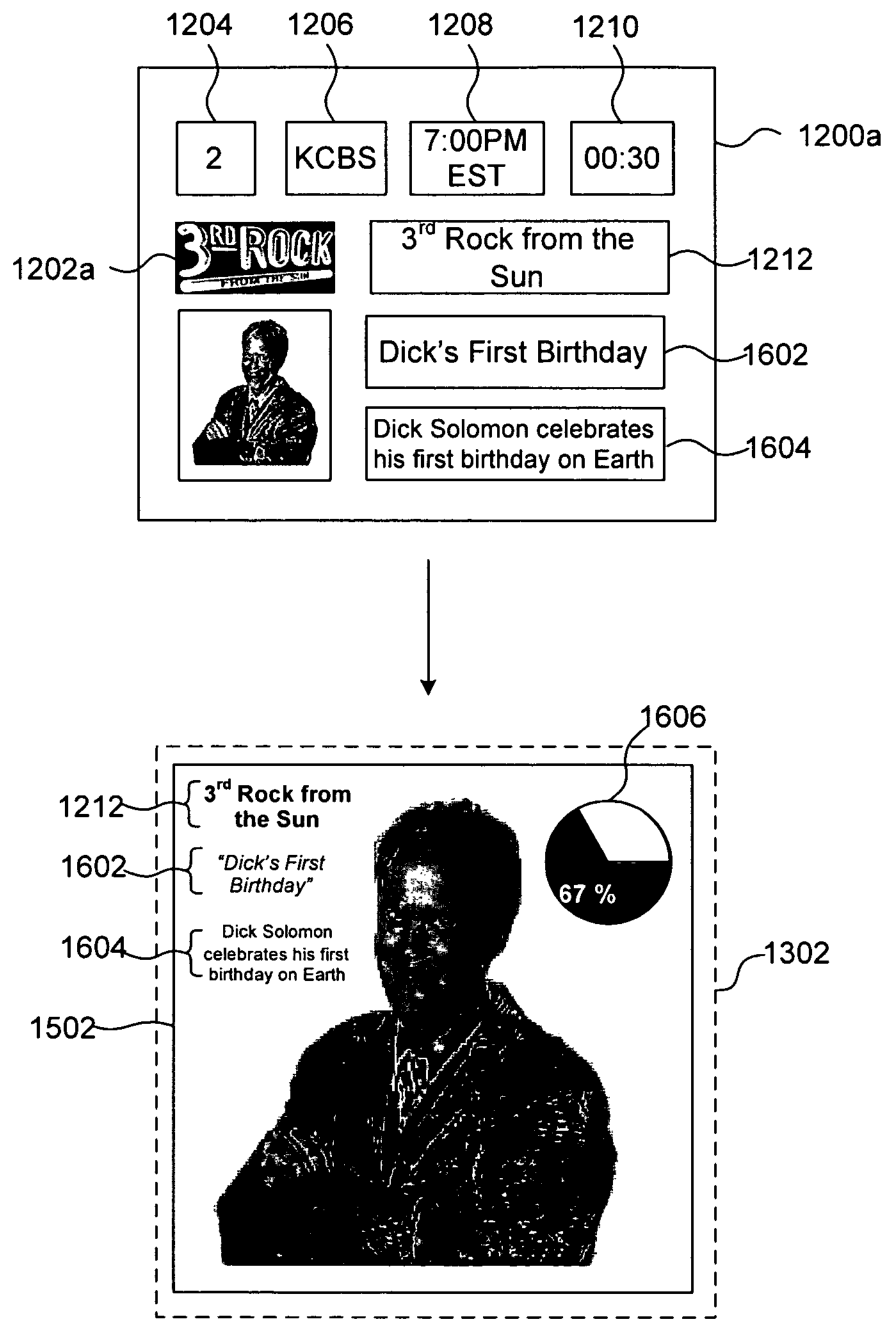
FIG. 16 is a block diagram of a card including supplemental information.

As shown in FIG. 16, a text description 1212 may be overlaid or superimposed over a graphical representation 1202, 1502. This may be accomplished using various techniques, such as configuring a displayed card 1200 with multiple graphical "layers", each layer representing either the graphical representation 1202, 1502, a text description 1212, or other display element.

In the depicted embodiment, a card 1200 may include or be associated with other types of supplemental information, such as a title 1602 and/or synopsis 1604, each of which may be likewise superimposed over the graphical representation 1502. All such information displayed on or in connection with a card 1200 is considered to be within the scope of the invention.

In other embodiments, a program completion indicator 1606 may be displayed on or near a graphical representation 1202, 1502 of a card 1200. The program completion indicator 1606 graphically (and/or textually) indicates the amount of a live television program that has been missed and/or is left to watch. The indicator 1606 may take various forms, such as the pie chart of FIG. 16 or the bar graph of FIG. 17. Additionally, the indicator 1606 may include a numerical percentage indicative of the program's completion status. Such an indicator 1606 may be valuable to a user in deciding whether to watch a program, particularly where a program is nearing completion.

The system 500, 700 may include a clock (not shown) that maintains an indication of the current time. Based on the starting time 1208 associated with a card 1200, the system 500, 700 may calculate how much of the program has been missed and generate an appropriate graph and/or text message. For instance, as shown in FIG. 16, if the current time is 7:40 PM, a pie chart may indicate that 67% of "3rd Rock from the Sun" has been missed. In the depicted embodiment, the program completion indicator 1606 may be superimposed over the graphical representation 1502 as described above.

Figure 17:
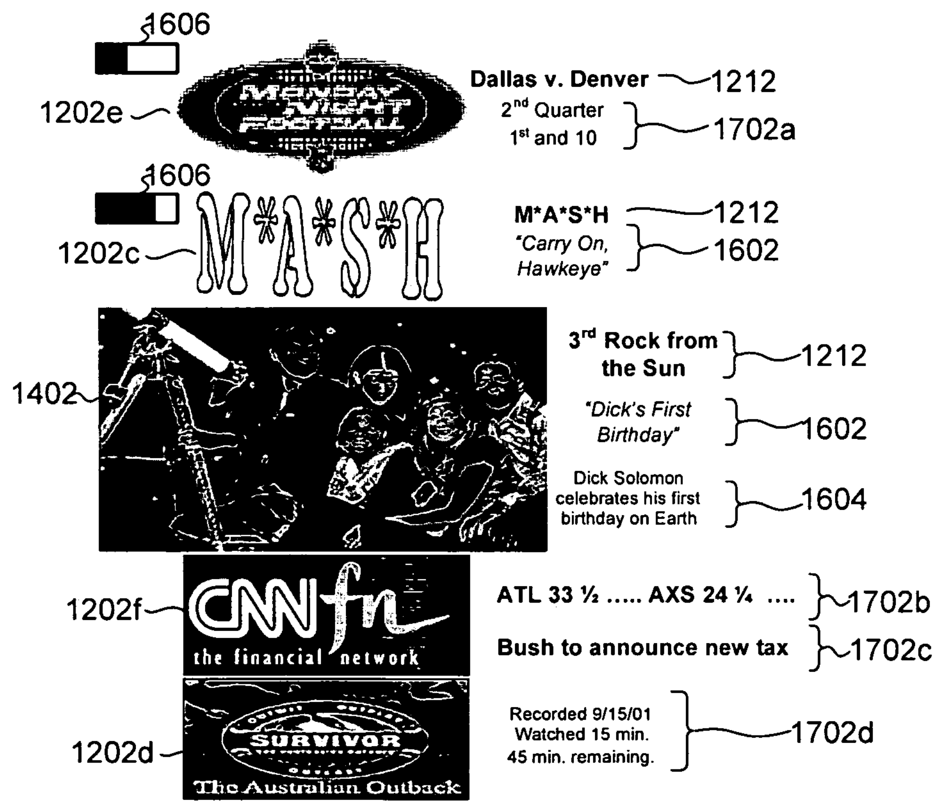
FIG. 17 is a user interface including a sequence of cards, as well as supplemental information and program completion indicators.

Referring to FIG. 17, a displayed card 1200 may be accompanied by an status indicator 1702 that provides status information concerning the represented option. For instance, the status indicator 1702 may relate to the current status (i.e. position, standing, state of affairs, condition, situation) of people, things, or events within an ongoing (live) television program.

For example, during a sporting event, such as a football or baseball game, the status indicator 1702*a* may display the score, field position, down, inning, strike count, clock, etc. In other embodiments, the status indicator 1702 may indicate a person being interviewed on a talk show, the current prize level or question in a suitable game show (e.g., "Who Wants to be a Millionaire®"), or a description of an item being currently offered on a shopping channel (e.g., QVC®).

In other embodiments, the status indicator 1702 may relate generally to the subject matter of a represented television program and not to any event being currently depicted. For instance, in the case of a card 1200 representing CNN/fn®, a status indicator 1702*b* may be embodied as a stock ticker. Alternatively, a status indicator 1702*c* could include a news headline. Similarly, a weather forecast could be shown in connection with a card 1200 representing The Weather Channel®.

The status indicator 1702 may be generated from information stored within the card 1200. For instance, where a sporting event is being tape delayed, score information may be stored within a corresponding card 1200, which may then be received by the system 500, 700. Alternatively, where the system 500, 700 already includes a card 1200 representing the sporting event, score information within the card 1200 may be updated using various techniques, such as ATVEF triggers. In still other embodiments, the system 500, 700 may not store such information within a card 1200, but may include a link, such as a URL, to a website from which the information may be retrieved on demand using HTTP or other suitable protocols.

In one configuration, a card 1200 may represent a television program recorded by the PVR module 306 with the system 500, 700. The card 1200 may include a file or path name (not shown) to a media file stored within a hard disk drive 303 or the like of the system 500, 700. In such an embodiment, the status indicator 1702*c* may indicate when the program was recorded, whether the program has been watched, and/or how much of the program is left to watch.

Of course, a variety of other status indicators 1702 may be provided for different types of cards 1200 indicating the status of functions, operations, or tasks associated with a represented option. All such status indicators 1702 used in connection with cards 1200 are considered to be within the scope of the invention.

All of the above-described supplemental information that may be displayed with cards 1200, e.g., text descriptions 1212, titles 1602, synopses 1604, program completion indicators 1606, status indicators 1702, and the like, may be fully user configurable, such that a user may decide whether and how much of such information may be displayed. Moreover, the makeup and organization of displayed sequences 1300 of cards may be configured by a user in any suitable manner.

Figure 18:
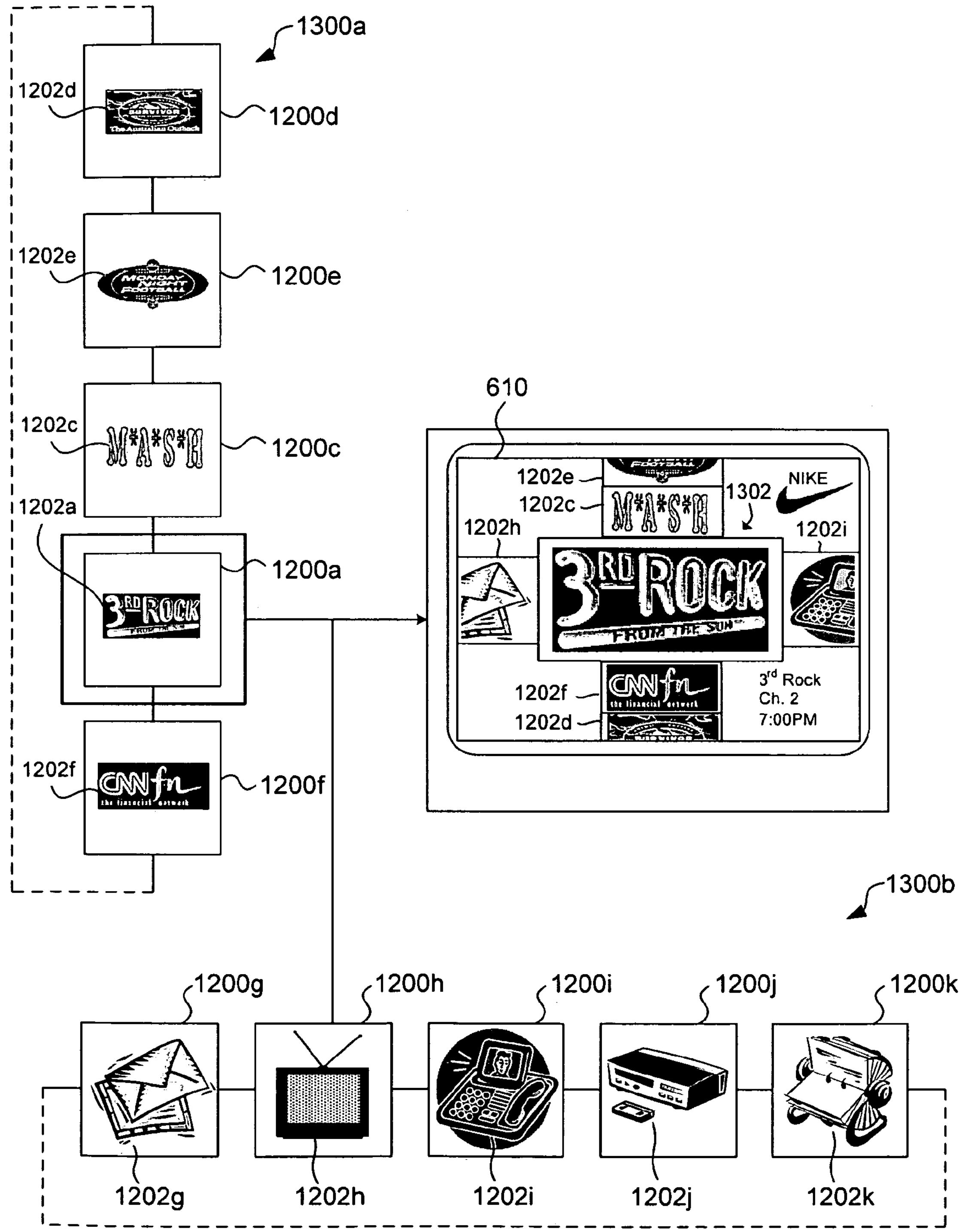
FIG. 18 is a block diagram of two sequences of cards displayed along perpendicular axes.

Referring to FIG. 18, multiple sequences 1300*a-b* including different types of cards 1200 may be displayed simultaneously. For instance, one or more cards 1200 from a sequence 1300*a* representing television programs may be displayed as described in reference to FIG. 14. In addition, one or more cards 1200 from a sequence 1300*b* representing interactive channels, applications, or digital media, may also be displayed.

As illustrated, the second sequence 1300*b* may be displayed horizontally, perpendicular to the first sequence 1300*a*, such that the sequences 1300*a-b* intersect at (and define) the focus area 1302. Any number of sequences 1300 may be displayed on the GUI 610 simultaneously. Of course, the selection of vertical and horizontal for the sequences 1300*a-b* is merely exemplary and not required.

In the depicted embodiment, "Up" and "Down" buttons may be used to shift or cycle the vertically-displayed sequence 1300*a* within the GUI 610 in order to bring one of the corresponding cards 1200*a-e* into the focus area 1302. Likewise, "Left" and "Right" buttons may be used to shift or cycle the horizontally-displayed sequence 1300*b* to bring one of the corresponding cards 1200*g-k* into the focus area 1302.

In one implementation, bringing a card 1200 from one sequence 1300 into the focus area 1302 will determine or change which other sequence 1300 is displayed. For example, bringing the card 1200*h* (TV shape) from the horizontal sequence 1300*b* into focus may result in the vertical sequence 1300*a* (television programs) being displayed. Alternatively, bringing the card 1200*g* (envelope shape) into focus may result in a vertical sequence 1300 (not shown) corresponding to e-mail messages or contacts. Likewise, bringing the card 1200*i* (videophone shape) into focus may result in a vertical sequence 1300 of a videoconferencing buddy list, while the card 1200*j* (VCR shape) may display a vertical sequence 1300 of television programs recorded by a PVR. In alternative embodiments, a selection from a vertical sequence 1300 may affect which horizontal sequence 1300 is displayed.

Figure 19:
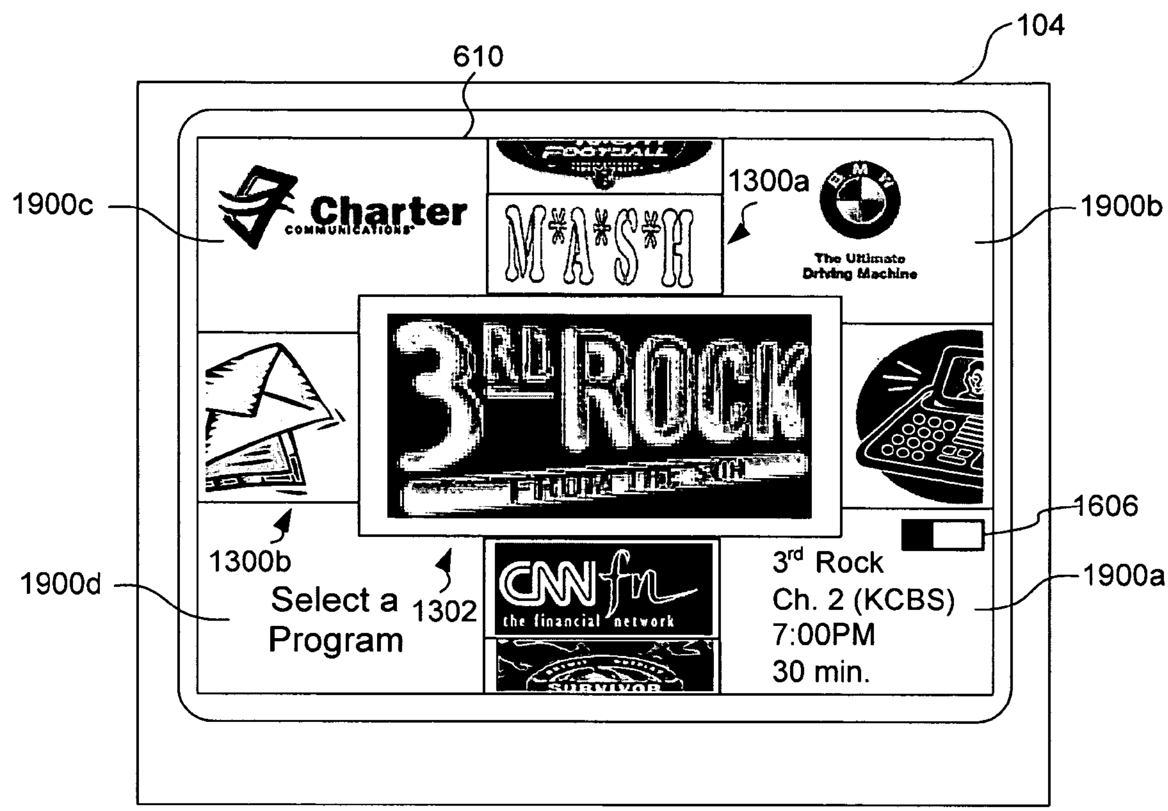
FIG. 19 is a user interface including context-sensitive areas.

Referring to FIG. 19, a number of context-sensitive areas 1900 may be provided within the GUI 610. As depicted, the context-sensitive areas 1900 may be quadrants of the GUI 610 formed by the intersection of two displayed sequences 1300*a-b*. Alternatively, the context-sensitive areas 1900 may be hemispheres formed by a single sequence 1300. However, any number of context-sensitive areas 1900 may be provided within the scope of the invention. Unlike the embodiment depicted in FIG. 15, the context-sensitive areas 1900 may be in fixed locations outside of the focus area 1302 or the area used by the displayed sequences 1300*a-b*.

In one embodiment, a context-sensitive area 1900*a* in a lower-right quadrant of the GUI 100 may display supplemental information (e.g., channel numbers 1204, channel identifiers 1206, starting times 1208, running times 1210, text descriptions 1212, titles 1602, synopses 1604, program completion indicators 1606, status indicators 1702, etc.) related to the card 1200 in the focus area 1302. The supplemental information may be obtained from the card 1200, itself, or retrieved from a network using HTTP, ATVEF triggers, or other suitable techniques.

Additionally, a context-sensitive area 1900*b* in an upper-right quadrant may be used for displaying advertisements related to the card 1200 in the focus area 1302. For example, in an episode of "3rd Rock from the Sun" featuring Dick Solomon driving a new BMW®, a suitable graphical image, video clip, flash animation, or the like, may be displayed. The advertisement may be displayed in response to receipt of an ATVEF trigger by the system 500, 700, although other mechanisms may be used within the scope of the invention.

A context-sensitive area 1900*c* in an upper-left quadrant may be used for branding purposes. For instance, as shown in FIG. 19, the context-sensitive area 1900*c* may show a logo for a provider (e.g., cable or satellite) of the television programs represented by the sequence 1300*a*.

Finally, a context-sensitive area 1900*d* in a lower-left quadrant may be used to display system notes and instructional text. For example, where the user is navigating a sequence 1300*a* of cards 1200 corresponding to television programs, instructional text may be provided that prompts the user to select a television program. Other uses may include e-mail, videophone, or instant messaging notifications, reminders, warnings, or the like.

The relative sizes of the context-sensitive areas 1900 may vary depending, for instance, on the location of the intersection (focus area 1302) of the displayed sequences 1300*a-b*. If the intersection is near the center of the GUI 610, the context-sensitive areas 1900 may be equal in size; otherwise, the relative sizes of the context-sensitive areas 1900 may vary.

In alternative embodiments, one or more areas of the GUI 610 may display user-specific or user-targeted information, i.e. customized information for a specific user. The information may be targeted based on a user profile stored within or accessible to the system 500, 700. For instance, the system 500, 700 may be configured to display the BMW advertisement of FIG. 19 if the user profile indicates that a user is a male, age 40 or above, with an income exceeding $150,000 per year. Of course, a variety of other user-specific or user-targeted information may be provided within the scope of the invention.

In certain implementations, a loop of sequentially-displayed supplemental information items may be displayed within one or more of the context-sensitive areas 1900 of the GUI 610. For instance, a context-sensitive area 1900 may display a sequence of advertisements, news headlines, weather reports, or other information. The individual items may be configured to be displayed at or for certain time periods, as configured by the user or a content producer.

Multiple supplemental information loops may be displayed simultaneously in different context-sensitive areas 1900. In such an embodiment, the loops may be synchronized in various ways. For instance, multiple loops may be synchronized in order to not simultaneously display an identical or similar item of supplemental information in two or more context-sensitive areas 1900. Likewise, multiple loops may be synchronized such that items of supplemental information may rotate through different context-sensitive areas 1900 in a carousel fashion. In this manner, advertising need not always be displayed in the upper-right area 1900 of the GUI 610.

In view of the foregoing, the present invention offers a number of advantages not found in conventional approaches. Advanced ITV features, such as videoconferencing, personal video recording, and the like, may be provided to subscribers without the inconvenience and expense of replacing currently-installed STBs 102 with advanced STBs 1302. Moreover, existing home PCs, networks, and STBs 102 may be leveraged such that the only additional hardware requirement, i.e. an MCX 404, may be as simple and inexpensive as possible. Unlike conventional systems, the PCMC 1402 and the TV 104 need not be collocated, making installation easier and reducing costs. Furthermore, GUIs 610 may be displayed on multiple TVs 104 by a single PCMC 1402, which is not possible with conventional advanced STBs 1302.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A home entertainment system comprising:

a home media center for providing media content to a plurality of remotely located televisions within a home, the home media center including:

a user interface module to generate graphical commands usable by a separate media center extension to render a user interface on one of the plurality of televisions, wherein the user interface comprises:

a focus area intersected by a first axis and a second axis, the second axis being perpendicular to the first axis;

a first sequence of cards displayed along the first axis, wherein a user is allowed to scroll the first sequence of cards through a focus area of the user interface to place a particular card within the focus area;

a second sequence of cards displayed along a second axis in response to a first card from the first sequence being scrolled into the focus area without an additional selection action with respect to the first card, wherein a user is allowed to scroll the second sequence of cards along the second axis;

wherein each card represents a single option, and wherein a representation of only one option at a time is scrolled through the focus area; and a network interface to send the graphical commands representing the user interface through a home network to a media center extension to be rendered thereby.

2. The system of claim 1, further comprising:

a plurality of media center extensions coupled to the home media center via the home network, each media center extension including:

a network interface to receive the graphical commands from the home media center via the home network; and a display interface to render the graphical commands into the user interface on a respective television.

3. The system of claim 1, wherein the media center extension further comprises:

an input to receive a media signal from a media source; and an encoder to encode the media signal into a first media stream, wherein the network interface is to send the first media stream to the home media center via the home network.

4. The system of claim 3, wherein the media center extension further comprises:

a decoder to decode a second media stream into a second media signal, the second media stream being received via the network from the home media center on the network interface, and wherein the display interface is to render the second media signal on the television.

5. The system of claim 4, wherein the home media center further comprises:

a storage device to buffer the first media stream, and wherein the second media stream originated from the first media stream.

6. The system of claim 1, wherein the media center extension further comprises:

a wireless receiver to receive a user command from a remote control device, and wherein the network interface of the media center extension is to relay the user command to the home media center.

7. The system of claim 1, wherein the user interface comprises an Electronic Program Guide (EPG).

8. The system of claim 1, wherein at least one card represents an interactive application selected from the group consisting of an e-mail client, a chat client, a videophone client, and a media player.

9. The system of claim 8, wherein the first sequence of cards are to be scrolled along the first axis at a user-selected rate.

10. The system of claim 1, wherein at least one card represents a television channel.

11. The system of claim 1, wherein the user interface further comprises:

at least one context-sensitive area that displays supplemental information related to the card within the focus area.

12. The system of claim 11, wherein the supplemental information is one of a title, a synopsis, a channel number, a channel name, a starting time, a running time, an advertisement, and instructional text.

13. The system of claim 1, wherein the user interface further comprises a program completion indicator.

14. The system of claim 13, wherein the program completion indicator graphically indicates how much of television program represented by a card has been missed.

15. The system of claim 13, wherein the program completion indicator comprises one of pie chart, a bar graph, and a numerical percentage.

16. The system of claim 1, wherein the initiating action comprises pressing a first button on a remote control device, and wherein the terminating action is one of pressing the first button a second time, releasing the first button, and pressing a second button on the remote control device.

17. A method within a home entertainment system for providing media content to a plurality of remotely located televisions within a home, the method comprising:

connecting a home media center to one of a plurality of a media center extensions in communication with the media center through a home network, each of the media center extensions being coupled to a respective one of the plurality of televisions;

generating graphical commands within the home media center representing a user interface, wherein the user interface comprises:

a focus area intersected by a first axis and a second axis, the second axis being perpendicular to the first axis;

a first sequence of cards displayed along the first axis, wherein a user is allowed to scroll the first sequence of cards through a focus area of the user interface to place a particular card within the focus area;

a second sequence of cards displayed along a second axis in response to a first card from the first sequence being scrolled into the focus area without an additional selection action with respect to the first card, wherein a user is allowed to scroll the second sequence of cards along the second axis;

wherein each card represents a single option, and wherein a representation of only one option at a time is scrolled through the focus area; and transporting the graphical commands through the home network to the media center extension to be rendered thereby.

18. The method of claim 17, further comprising:

rendering the graphical commands into the user interface on a television attached to the media center extension.

19. The method of claim 18, further comprising:

receiving a media signal from a media source at a media center extension;

transforming the media signal into a first media stream; and transporting the first media stream to the home media center via the home network.

20. A system for providing media content to a plurality of remotely located televisions within a home, the system comprising:

means for connecting a home media center to one of a plurality of a media center extensions in communication with the media center through a home network, each of the media center extensions being coupled to a respective one of the plurality of televisions;

means for generating graphical commands within the home media center representing a user interface, wherein the user interface comprises:

a focus area intersected by a first axis and a second axis, the second axis being perpendicular to the first axis;

a first sequence of cards displayed along the first axis, wherein a user is allowed to scroll the first sequence of cards through a focus area of the user interface to place a particular card within the focus area;

a second sequence of cards displayed along a second axis in response to a first card from the first sequence being scrolled into the focus area without an additional selection action with respect to the first card, wherein a user is allowed to scroll the second sequence of cards along the second axis;

wherein each card represents a single option, and wherein a representation of only one option at a time is scrolled through the focus area; and means for transporting the graphical commands through the home network to the media center extension to be rendered thereby.

* * * * *